(12) United States Patent
Kitamura

(10) Patent No.: US 9,483,715 B2
(45) Date of Patent: Nov. 1, 2016

(54) CLASSIFYING DEVICE, CLASSIFYING PROGRAM, AND METHOD OF OPERATING CLASSIFYING DEVICE

(71) Applicant: FUJIFILM Corporation, Tokyo (JP)

(72) Inventor: Yoshiro Kitamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/669,518

(22) Filed: Mar. 26, 2015

(65) Prior Publication Data
US 2015/0199593 A1 Jul. 16, 2015

Related U.S. Application Data
(63) Continuation of application No. PCT/JP2013/005752, filed on Sep. 27, 2013.

(30) Foreign Application Priority Data
Sep. 28, 2012 (JP) .................................. 2012-217956

(51) Int. Cl.
*G06K 9/34* (2006.01)
*G06K 9/62* (2006.01)
(Continued)

(52) U.S. Cl.
CPC .......... *G06K 9/6267* (2013.01); *G06T 7/0079* (2013.01); *G06T 7/0081* (2013.01); *G06T 7/0093* (2013.01); *G06T 7/602* (2013.01); *G06T 11/206* (2013.01); *G06T 2207/10081* (2013.01);
(Continued)

(58) Field of Classification Search
CPC . G06K 9/6267; G06T 11/206; G06T 7/0079; G06T 7/0081; G06T 7/0093; G06T 7/602; G06T 2207/10081; G06T 2207/10088; G06T 2207/10116; G06T 2207/30048; G06T 2207/30096; G06T 2207/30101; G06T 2207/30172
USPC ................ 382/180, 224, 159, 128, 173, 203
See application file for complete search history.

(56) References Cited

U.S. PATENT DOCUMENTS 5,923,646 A * 7/1999 Mandhyan .............. H04J 3/085
  370/254
8,452,088 B1 * 5/2013 De Ponti ........... G06F 17/30256
  382/165

(Continued)

FOREIGN PATENT DOCUMENTS

JP 2010-287091 A 12/2010

OTHER PUBLICATIONS

H. Ishikawa, "Exact optimization for Markov random fields with convex priors", IEEE PAMI, 2003, pp. 1333-1336, vol. 25, No. 10.
(Continued)

*Primary Examiner* — Mekonen Bekele
(74) *Attorney, Agent, or Firm* — Sughrue Mion, PLLC

(57) ABSTRACT

When each pixel forming image data is classified into one of N labels (where N>2) which are ordered from 0 to N−1, a binary graph setting unit sets a binary graph where the i-th layer i is a boundary between the label i−1 and the label i of the N labels, a class to which a label equal to or higher than i is assigned corresponds to a virtual label 0, and a class to which a label equal to or smaller than i−1 is assigned corresponds to a virtual label 1, a layer-by-layer labeling unit performs a graph cut operation on the binary graph of each layer, and then a label determining unit determines which of the N labels each pixel belongs to based on the virtual labels assigned to all the binary graphs.

11 Claims, 16 Drawing Sheets

(51) Int. Cl.
*G06T 7/00* (2006.01)
*G06T 11/20* (2006.01)
*G06T 7/60* (2006.01)

(52) U.S. Cl.
CPC ............... *G06T 2207/10088* (2013.01); *G06T 2207/10116* (2013.01); *G06T 2207/30048* (2013.01); *G06T 2207/30096* (2013.01); *G06T 2207/30101* (2013.01); *G06T 2207/30172* (2013.01)

(56) References Cited

U.S. PATENT DOCUMENTS

| | | | | |
|---|---|---|---|---|
| 8,478,044 B2* | 7/2013 | Grady | ............ | G06T 7/0081 382/128 |
| 9,311,732 B2* | 4/2016 | Kitamura | ............ | G06T 7/0083 |
| 2007/0014473 A1* | 1/2007 | Slabaugh | ............ | G06K 9/6206 382/173 |
| 2007/0160277 A1* | 7/2007 | Slabaugh | ............ | G06K 9/342 382/128 |
| 2009/0304280 A1* | 12/2009 | Aharoni | ............ | G06T 7/0081 382/180 |
| 2010/0169311 A1* | 7/2010 | Tengli | ............ | G06F 17/30864 707/736 |
| 2011/0004449 A1* | 1/2011 | Rossignac | ............ | G06F 17/10 703/2 |
| 2011/0044352 A1* | 2/2011 | Chaitou | ............ | H04L 45/04 370/408 |
| 2011/0052063 A1* | 3/2011 | McAuley | ............ | G06K 9/527 382/180 |
| 2012/0082371 A1* | 4/2012 | Bengio | ............ | G06K 9/6282 382/159 |
| 2012/0314949 A1* | 12/2012 | Grady | ............ | G06T 7/0081 382/173 |
| 2015/0199832 A1* | 7/2015 | Kitamura | ............ | G06T 7/0083 382/128 |

OTHER PUBLICATIONS

V. Kolmogorov et al., "What Energy Functions can be Minimized via Graph Cuts?", IEEE PAMI, 2004, pp. 147-159, vol. 26, No. 2.
S. Ramalingam et al., "Exact Inference in Multi-label CRF's with Higher Order Cliques", IEEE, 2008, pp. 1-8.
International Search Report for PCT/JP2013/005752 dated Jan. 28, 2014.
Boykov Y et al: "Graph cuts and efficient N-D image segmentation", International Journal of Computer Vision, Kluwer Academic Publishers, Norwell, US vol. 70, No. 2, Nov. 1, 2006, pp. 109-131.
Communication dated Nov. 6, 2015 from the European Patent Office in counterpart application No. 13840370.4.

* cited by examiner

FIG.16
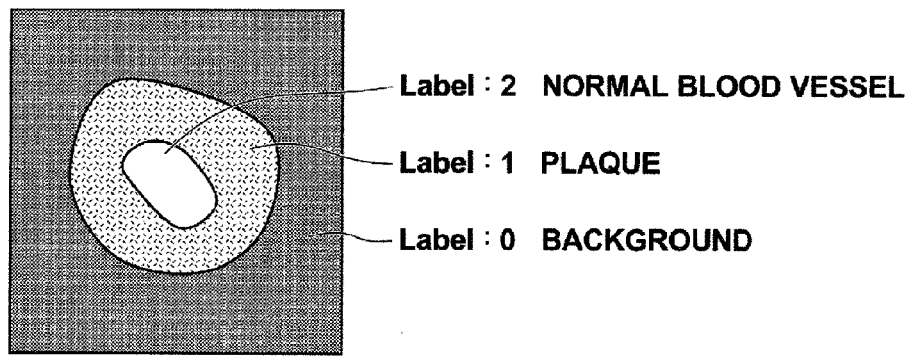
FIG.17
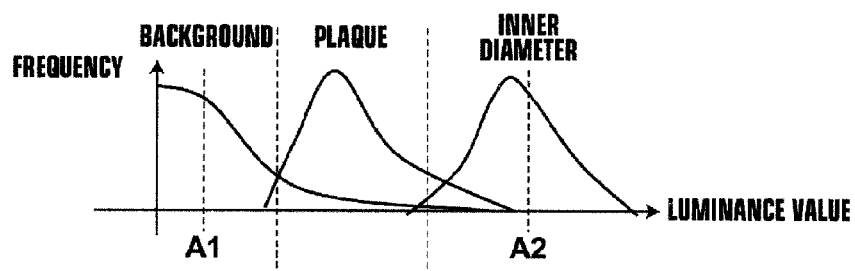
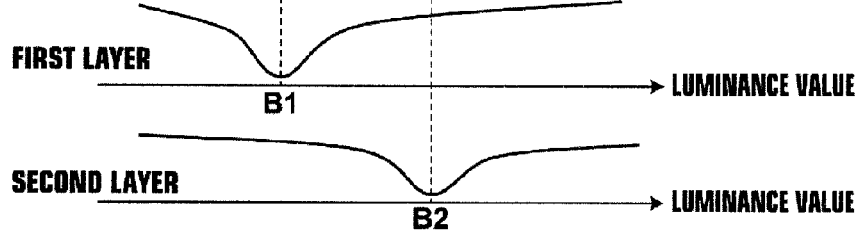

0,0,0,0   1,1,1,1

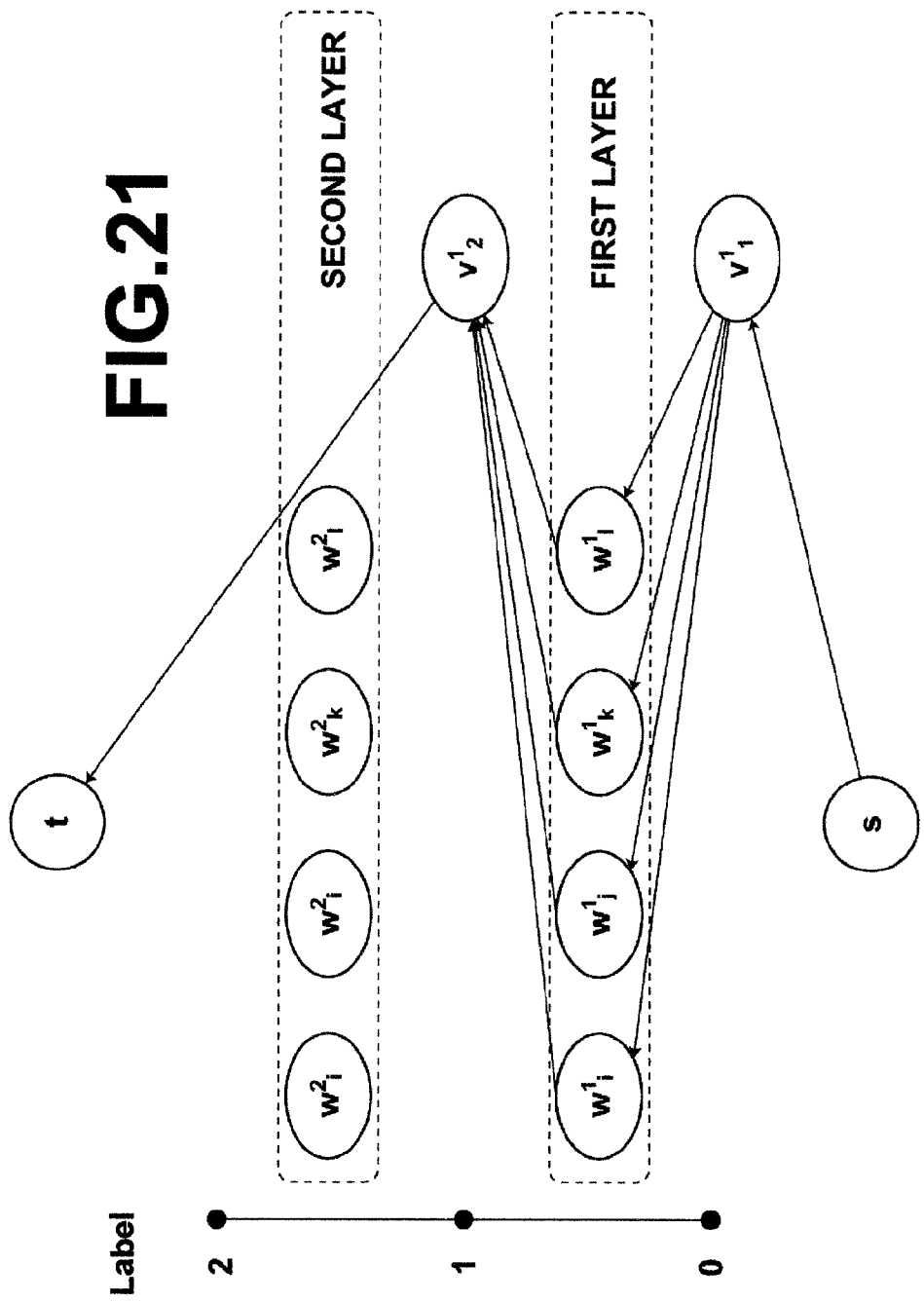

CLASSIFYING DEVICE, CLASSIFYING PROGRAM, AND METHOD OF OPERATING CLASSIFYING DEVICE

CROSS-REFERENCE TO RELATED APPLICATIONS

This application is a Continuation of PCT International Application No. PCT/JP2013/005752 filed on Sep. 27, 2013, which claims priority under 35 U.S.C. §119(a) to Japanese Patent Application No. 2012-217956 filed on Sep. 28, 2012. Each of the above applications is hereby expressly incorporated by reference, in its entirety, into the present application.

BACKGROUND OF THE INVENTION

1. Technical Field

The present invention relates to a classifying device, a classifying program, and a classifying method for classifying an image into regions of three or more classes using a graph-cut technique.

2. Background Art

In recent years, energy minimization using a minimum graph cut (graph cut) algorithm is being frequently applied to image processing. In particular, methods for efficiently solving a problem of image segmentation (region segmentation) as an energy minimization problem have been proposed.

Ishikawa has extended a graph-cut technique that partitions an image of interest into two classes by minimizing a second-order energy function to allow partitioning into multiple ordered classes (see H. Ishikawa, "Exact optimization for Markov random fields with convex priors", IEEE PAMI, Vol. 25, No. 10, pp. 1333-1336, 2003, hereinafter, Non-Patent Literature 1).

Further, Kolmogorov, et. al., have proposed a method for minimizing a third-order energy when partitioning into two classes is performed. Kolmogorov, et. al., have also introduced a method using a third-order energy when partitioning into multiple classes is performed. This method allows solving a multiple-class problem by repeatedly solving two-class problems to label multiple classes, where the multiple classes may not be multiple ordered classes (see V. Kolmogorov and R. Zabih, "What Energy Functions Can Be Minimized via Graph Cuts?", IEEE PAMI, Vol. 26, No. 2, pp. 147-159, 2004, hereinafter, Non-Patent Literature 2).

SUMMARY OF INVENTION

The method introduced by Non-Patent Literature 1, however, does not handle a third-order energy and is not applicable to a problem of partitioning into multiple classes using a third- or higher order energy.

The method introduced by Non-Patent Literature 2 can solve a multiple-class problem where the multiple classes may not be multiple ordered classes; however, the obtained solution is an approximate solution, which leads to increased computational cost.

In view of the above-described circumstances, the present invention is directed to providing a classifying device, a classifying program, and a method of operating a classifying device that can achieve high speed classification into multiple ordered classes using a graph-cut technique.

A classifying device of the invention is a classifying device for classifying each pixel forming image data into one of N labels, where N>2, which are ordered from 0 to N−1, the classifying device comprising labeling means for assigning each pixel with one of the N labels by using a graph that includes k layers, where k=N−1, which are set between a vertex s and a vertex t and each of which layers is a boundary between the labels, vertices $w^{\alpha}_v$, where $\alpha=1, \ldots, k$, which are set on each layer $\alpha$, where $\alpha=1, \ldots, k$, and which vertices correspond to locations v of individual pixels of the image, and edges each connecting two of the vertices $w^{\alpha}_v$, the vertex t, and the vertex s, and by determining edges to be cut among the edges by a graph cut operation, wherein the labeling means comprises:

binary graph setting means for setting, for each i-th layer i that is the boundary between a label i−1 and a label i of the N labels, a binary graph including edges each connecting two of the vertices $w^i_v$, the vertex s corresponding to a virtual label 0, and the vertex t corresponding to a virtual label 1, wherein the virtual label 1 indicates that a label that is equal to or higher than i is assigned to the location v corresponding to the vertex $w^i_v$ on the layer i, and the virtual label 0 indicates that a label that is equal to or lower than i−1 is assigned to the location v corresponding to the vertex $w^i_v$ on the layer i;

energy setting means for setting an energy for each edge of the binary graph for each layer depending on which of the virtual label 0 and the virtual label 1 each vertex belongs to;

layer-by-layer labeling means for assigning one of the virtual label 0 and the virtual label 1 to each vertex $w^i_v$ on each layer by determining edges to be cut among the edges of the binary graph of the layer by performing a graph cut operation on the entire graph including the binary graphs for the individual layers with the energies set therefor; and label determining means for determining which of the N labels the pixel at each location v belongs to depending on which of the virtual label 0 and the virtual label 1 is assigned to each vertex $w^i_v$, where $i=1, \ldots, k$, on the first to the k-th layers, which corresponds to the same location v.

A classifying program of the invention is a classifying program for causing a computer to function as a classifying device for classifying each pixel forming image data into one of N labels, where N>2, which are ordered from 0 to N−1, wherein the computer functions as labeling means for assigning each pixel with one of the N labels by using a graph that includes k layers, where k=N−1, which are set between a vertex s and a vertex t and each of which layers is a boundary between the labels, vertices $w^{\alpha}_v$, where $\alpha=1, \ldots, k$, which are set on each layer $\alpha$, where $\alpha=1, \ldots, k$, and which vertices correspond to locations v of individual pixels of the image, and edges each connecting two of the vertices $w^{\alpha}_v$, the vertex t, and the vertex s, and by determining edges to be cut among the edges by a graph cut operation, wherein the labeling means comprises:

binary graph setting means for setting, for each i-th layer i that is the boundary between a label i−1 and a label i of the N labels, a binary graph including edges each connecting two of the vertices $w^i_v$, the vertex s corresponding to a virtual label 0, and the vertex t corresponding to a virtual label 1, wherein the virtual label 1 indicates that a label that is equal to or higher than i is assigned to the location v corresponding to the vertex $w^i_v$ on the layer i, and the virtual label 0 indicates that a label that is equal to or lower than i−1 is assigned to the location v corresponding to the vertex $w^i_v$ on the layer i;

energy setting means for setting an energy for each edge of the binary graph for each layer depending on which of the virtual label 0 and the virtual label 1 each vertex belongs to;

layer-by-layer labeling means for assigning one of the virtual label 0 and the virtual label 1 to each vertex $w^i_v$ on each layer by determining edges to be cut among the edges of the binary graph of the layer by performing a graph cut operation on the entire graph including the binary graphs for the individual layers with the energies set therefor; and label determining means for determining which of the N labels the pixel at each location v belongs to depending on which of the virtual label 0 and the virtual label 1 is assigned to each vertex $w^i_v$, where i=1, ..., k, on the first to the k-th layers, which corresponds to the same location v.

A method of operating a classifying device of the invention is a method of operating a classifying device including labeling means for classifying each pixel forming image data into one of N labels, where N>2, which are ordered from 0 to N−1, the method comprising a labeling step wherein the labeling means assigns each pixel with one of the N labels by using a graph that includes k layers, where k=N−1, which are set between a vertex s and a vertex t and each of which layers is a boundary between the labels, vertices $w^α_v$, where α=1, ..., k, which are set on each layer α, where α=1, ..., k, and which vertices correspond to locations v of individual pixels of the image, and edges each connecting two of the vertices $w^α_v$, the vertex t, and the vertex s, and by determining edges to be cut among the edges by a graph cut operation, wherein the labeling step comprises:

a binary graph setting step of setting, for each i-th layer i that is the boundary between a label i−1 and a label i of the N labels, a binary graph including edges each connecting two of the vertices $w^i_v$, the vertex s corresponding to a virtual label 0, and the vertex t corresponding to a virtual label 1, wherein the virtual label 1 indicates that a label that is equal to or higher than i is assigned to the location v corresponding to the vertex $w^i_v$ on the layer i, and the virtual label 0 indicates that a label that is equal to or lower than i−1 is assigned to the location v corresponding to the vertex $w^i_v$ on the layer i;

an energy setting step of setting an energy for each edge of the binary graph for each layer depending on which of the virtual label 0 and the virtual label 1 each vertex belongs to;

a layer-by-layer labeling step of assigning one of the virtual label 0 and the virtual label 1 to each vertex $w^i_v$ on each layer by determining edges to be cut among the edges of the binary graph of the layer by performing a graph cut operation on the entire graph including the binary graphs for the individual layers with the energies set therefor; and a label determining step of determining which of the N labels the pixel at each location v belongs to depending on which of the virtual label 0 and the virtual label 1 is assigned to each vertex $w^i_v$, where i=1, ..., k, on the first to the k-th layers, which corresponds to the same location v.

The "N labels which are ordered" as used herein refers to the relationship among a plurality of labels that are ordered in a row. For example, a set of higher labels in the order is included in a set of labels which are lower than the higher labels.

It is desirable that the binary graph include an edge that connects two adjacent vertices $w^i_v$ on the same layer i to each other, an edge $(s,w^i_v)$ that connects the vertex s to each vertex $w^i_v$, and an edge $(w^i_v,t)$ that connects each vertex $w^i_v$ to the vertex t, and the label determining means determine, for each vertex $w^i_v$, that the label 0 is assigned to the pixel corresponding to the vertex $w^i_v$ if all the vertices $w^i_v$ corresponding to the same location v on all the layers belong to the virtual label 0, that the label N−1 is assigned to the pixel corresponding to the vertex $w^i_v$ if all the vertices $w^i_v$ corresponding to the same location v on all the layers i belong to the virtual label 1, and that the pixel corresponding to the vertex $w^i_v$ belongs to a class p if the vertices $w^i_v$ corresponding to the same location v on the first to the p-th layers belong to the virtual label 0 and the vertices $w^i_v$ corresponding to the same location v on the p+1-th to the N−1-th layers belong to the virtual label 1.

It is desirable that the energy setting means set a first-order energy for each of the edge $(s,w^i_v)$ that connects the vertex s to the vertex $w^i_v$ and the edge $(w^i_v,t)$ that connects the vertex $w^i_v$ to the vertex t, and sets a second-order energy for the edge that connects two vertices $w^i_v$ and $w^i_u$ on the same layer to each other.

The first-order energy may be determined such that the first-order energy set for the edge $(s,w^i_v)$ is larger than the first-order energy set for the edge $(w^i_v,t)$ if there is a high likelihood that the pixel corresponding to the vertex $w^i_v$ has a pixel value that belongs to the virtual label 0, and the first-order energy set for the edge $(s,w^i_v)$ is smaller than the first-order energy set for the edge $(w^i_v,t)$ if there is a high likelihood that the pixel corresponding to the vertex $w^i_v$ has a pixel value that belongs to the virtual label 1, and the second-order energy may be determined such that a smaller second-order energy is set for the edge $(w^i_v,w^i_u)$ if it is more likely that the pixel corresponding to the vertex $w^i_v$ and the pixel corresponding to the adjacent vertex $w^i_u$ belong to the different virtual labels.

The energy setting means may set a third-order energy, which is determined depending on which of the virtual label 0 and the virtual label 1 each of pixels corresponding to arbitrary three vertices $w^i_v$ on the same layer belongs to, for each of edges that connect the three vertices $w^i_v$ to the vertex s or the vertex t via a virtual vertex $v^i$ for each layer.

The energy setting means may set a fourth- or higher order energy, which is determined depending on whether or not all of arbitrary four or more vertices on the same layer belong to the virtual label 0 or the virtual label 1, for each of edges that connect the four vertices $w^i_v$ to the vertex s or the vertex t via a virtual vertex $v^i$ for each layer.

Another classifying device of the invention is a classifying device for classifying each pixel forming image data into one of N labels, where N>2, which are ordered from 0 to N−1, the classifying device comprising labeling means for determining the label of each pixel by minimizing a third-order energy $E_I^{ijk}$:

$$E_I^{ijk} = \sum_{\alpha=1...N-1} E_I^{vi,vj,vk}(F(w_{vi},\alpha), F(w_{vj},\alpha), F(w_{vk},\alpha))$$

where $F(w_{vi},\alpha), F(w_{vj},\alpha),$ $$F(w_{vk},\alpha) = \begin{cases} 0 & \text{if } w_{vi}, w_{vj}, \text{ and } w_{vk} \text{ belong to a class lower than } \alpha \\ 1 & \text{else} \end{cases}$$

which depends on labels of locations vi, vj, and vk of three pixels of the image using a graph-cut technique.

Another classifying program of the invention is a classifying program for causing a computer to function as a classifying device for classifying each pixel forming image data into one of N labels, where N>2, which are ordered from 0 to N−1, wherein the computer functions as labeling means for determining the label of each pixel by minimizing a third-order energy $E_l^{ijk}$:

$$E_l^{ijk} = \sum_{\alpha=1\ldots N-1} E_l^{vi,vj,vk}(F(w_{vi}, \alpha), F(w_{vj}, \alpha), F(w_{vk}, \alpha))$$

where $F(w_{vi}, \alpha), F(w_{vj}, \alpha),$ $$F(w_{vk}, \alpha) = \begin{cases} 0 & \text{if } w_{vi}, w_{vj}, \text{ and } w_{vk} \text{ belong to a class lower than } \alpha \\ 1 & \text{else} \end{cases}$$

which depends on labels of locations vi, vj, and vk of three pixels of the image using a graph-cut technique.

A method of operating another classifying device of the invention is a method of operating a classifying device including labeling means for classifying each pixel forming image data into one of N labels, where N>2, which are ordered from 0 to N−1, the method comprising a labeling step of determining the label of each pixel by minimizing a third-order energy $E_l^{ijk}$:

$$E_l^{ijk} = \sum_{\alpha=1\ldots N-1} E_l^{vi,vj,vk}(F(w_{vi}, \alpha), F(w_{vj}, \alpha), F(w_{vk}, \alpha))$$

where $F(w_{vi}, \alpha), F(w_{vj}, \alpha),$ $$F(w_{vk}, \alpha) = \begin{cases} 0 & \text{if } w_{vi}, w_{vj}, \text{ and } w_{vk} \text{ belong to a class lower than } \alpha \\ 1 & \text{else} \end{cases}$$

which depends on labels of locations vi, vj, and vk of three pixels of the image using a graph-cut technique.

According to the classifying device of the invention, when each pixel forming image data is classified into one of N labels which are ordered using a graph-cut technique, the operation is replaced by N−1 binary graphs for performing classification into the virtual label 0 and the virtual label 1, and the N labels are assigned based on results of the virtual labels obtained by performing graph cut on the N−1 binary graphs. This allows obtaining an exact minimum solution at high speed.

Further, in the case where the third-order energy is set using binary graphs, an exact solution of the third-order energy, which is determined depending on belonging to which of the virtual label 0 and the virtual label 1, can be obtained if the labels are ordered, and this allows highly accurate labeling.

Further, in the case where the fourth- or a higher order energy, which is determined depending on whether or not all of arbitrary four or more pixels belong to the virtual label 0 or the virtual label 1, is set using binary graphs and is applied to partitioning such that the same label is assigned to the four or more pixels, an exact solution can be obtained.

BRIEF DESCRIPTION OF THE DRAWINGS

FIG. 16 is a diagram for explaining a blood vessel, plaque, and a background of a coronary artery, FIG. 17 shows a distribution of frequency of appearance of luminance values of a coronary artery, FIG. 21 is a diagram for explaining a graph of a fourth-order energy when classification into three classes is performed.

DESCRIPTION OF EMBODIMENTS

Hereinafter, embodiments of the present invention will be described in detail with reference to the drawings. A classifying device of the invention is implemented by executing a classifying program loaded on a computer. The classifying program is distributed with being stored in a storage medium, such as a CD-ROM, and is installed on the computer from the storage medium, such as a CD-ROM. Alternatively, the classifying program is distributed via a network, such as the Internet, and is installed on the computer.

Figure 1:
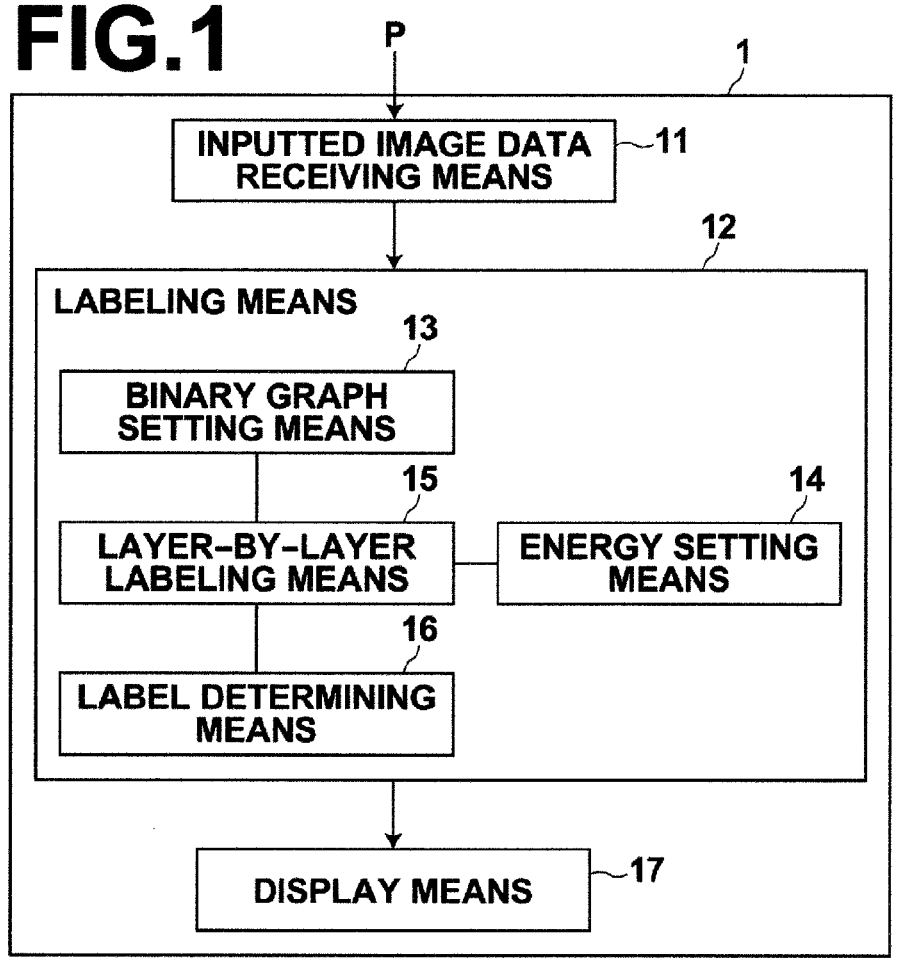
FIG. 1 is a block diagram illustrating the configuration of a classifying device.

First, a classifying device of a first embodiment according to the invention is described. FIG. 1 is a block diagram illustrating the configuration of a classifying device 1 according to the invention. In the embodiment of the invention, a technique to segment an image into regions of a plurality of classes by labeling each pixel in the image using a graph-cut technique is described.

As shown in FIG. 1, the classifying device 1 includes an inputted image data receiving means 11, a labeling means 12 for labeling each pixel in image data P, and a display means 17.

The labeling means 12 includes a binary graph setting means 13, an energy setting means 14, a layer-by-layer labeling means 15, and a label determining means 16.

The inputted image data receiving means 11 receives the inputted image data P to be subjected to image processing, and once stores the image data P in a storage device. The image data P may be a simple x-ray image, a tomographic image taken with a CT apparatus or a MRI apparatus, or the like. The image data P contains a plurality of organs, tissues, and/or a lesion.

The labeling means 12 assigns a label to each pixel in the image data P by performing energy minimization using a graph-cut technique, and segments the image such that the same organ, tissue, or lesion forms one region. For example, the image data P obtained by imaging a coronary artery is segmented into regions of the coronary artery, plaque in the coronary artery, and the background.

First, a technique for assigning one of a finite number of labels to each pixel in image data using graph cut, which technique involves performing labeling using a first-order energy $E^i$ that is determined depending on the value of each pixel, and a second-order energy $E^{ij}$ that is determined depending on the relationship between adjacent two pixels, is described. An energy function E used for the graph cut is defined as Equation (1):

$$E(x) = \sum_{i \in V} E^i(x_i) + \sum_{(i,j) \in W} E^{ij}(x_i, x_j). \quad (1)$$

In Equation (1), V is a set representing locations of the pixels (which will hereinafter be referred to as "sites") in the image data, and W is a set representing adjacency relationships between the sites. Namely, when $(i,j) \in W$, sites i and j are adjacent to each other. The sum of the first term in Equation (1) is a value that depends only on the label assigned to each site and is obtained by summing $E^i(x_i)$, and reflects a direct influence that is determined depending on which label is assigned to each site. The sum of the second term defines an energy to reflect previous knowledge as to what kind of relationship should be formed between adjacent sites, i.e., labels assigned to adjacent pixels.

Figure 2:
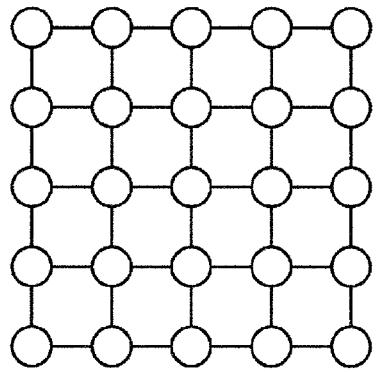
FIG. 2 is a diagram showing an array of pixels of an image.
Figure 3:
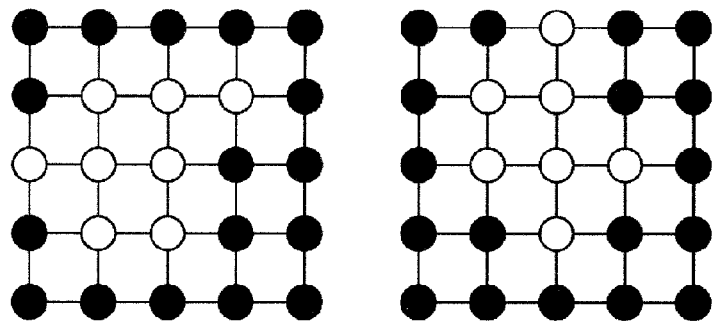
FIG. 3 is a diagram showing one example of images partitioned into binary regions.

First, a case of a binary image where each pixel Xi is "0" or "1" is described. As shown in FIG. 2, inputted image data is formed by points (white circles), where each white circle corresponds to one pixel. Using a graph-cut technique, which of binary regions "1" (black circle) or "0" (white circle) each pixel belongs to is determined, as shown in FIG. 3.

Figure 4:
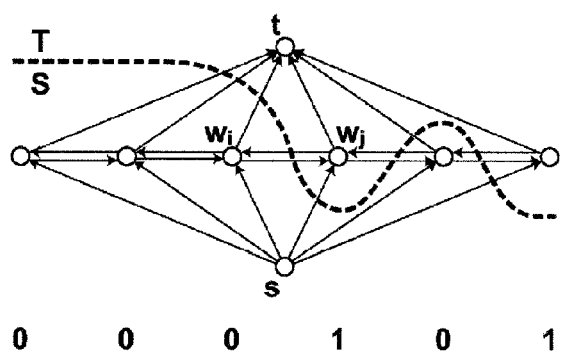
FIG. 4 is a diagram showing one example of a graph when classification into two classes is performed.

In this case, one of two labels L, {0, 1}, is assigned to each site, and a directed graph, as shown in FIG. 4, is made. The graph includes vertices $w_i$ ($w_j$) corresponding to individual sites i (j), and also includes two vertices s and t. First, for the vertex $w_i$ corresponding to each site i, an edge extending from the vertex s to the vertex $w_i$ and an edge extending from the vertex $w_i$ to the vertex t are made. Then, edges extending between vertices corresponding to adjacent sites are made.

The s and t of this graph relate the value of each pixel Xi to the label as shown by Equation (2):

$$Xi = \begin{cases} 0 & (\text{if } Wv \in S) \\ 1 & (\text{if } Wv \in T) \end{cases}. \quad (2)$$

That is, the label "1" is assigned to the site i when a cut with respect to the vertex $w_i$ of the graph is on the s side (the site belongs to t when the cut is on the s side), and the label "0" is assigned to the site i when the cut is on the t side. The label of each site is determined depending on which of the vertices s and t each site i is connected to after minimum graph cut.

The first-order energy $E^i(w_i)$ is defined for the edge extending from s to the vertex $w_i$ of the directed graph and the edge extending from the vertex $w_i$ to t, and the second-order energy $E^{ij}(w_i, w_j)$ is defined for the edges that connects the vertices corresponding to the adjacent sites.

In order to obtain the label for each site by minimizing the energy E(x) shown by Equation (1), the energy (weight) for each edge is determined such that the label that gives the minimum energy corresponds to the minimum cut. For example, if it is highly possible that the label "1" is assigned to the site i, the first-order energy $E^i(w_i)$ for the edge that connects the vertex $w_i$ to the vertex s is made smaller than the first-order energy $E^i(w_i)$ for edge that connects the vertex $w_i$ to the vertex t, and if it is highly possible that the label "0" is assigned to the site i, the first-order energy $E^i(w_i)$ for edge that connects the vertex $w_i$ to the vertex t is made smaller than the first-order energy $E^i(w_i)$ for the edge that connects the vertex $w_i$ to the vertex s. Further, if it is highly possible that the same label is assigned to the adjacent vertices $w_i$ and $w_j$, a large value is set for the edge extending between the vertices $w_i$ and $w_j$, and if it is highly possible that the different labels are assigned to the adjacent vertices $w_i$ and $w_j$, a small value is set for the edge extending between the vertices $w_i$ and $w_j$.

It is known that a minimum graph cut can be efficiently found using a maximum flow algorithm. Now, a technique to convert the second-order energy into a graph is described.

Let the second-order energy $E^{ij}(0,0)=A$ where both the vertices $w_i$ and $w_j$ belong to S, the second-order energy $E^{ij}(0,1)=B$ where the vertex $w_i$ belongs to S and the vertex $w_j$ belongs to T, the second-order energy $E^{ij}(1,0)=C$ where the vertex $w_i$ belongs to T and the vertex $w_j$ belongs to S, and the second-order energy $E^{ij}(1,1)=D$ where both the vertices $w_i$ and $w_j$ belong to T. The energies A, B, C, and D are defined to reflect previous knowledge depending on the pixel values of the pixels corresponding to the vertices $w_i$ and $w_j$.

The second-order energy can be expressed as shown by Table 1:

TABLE 1

| $E^{ij} =$ | $E^{ij}(0, 0)$ | $E^{ij}(0, 1)$ | = | A | B |
|---|---|---|---|---|---|
|  | $E^{ij}(1, 0)$ | $E^{ij}(1, 1)$ |  | C | D. |

Table 1 can be rewritten as shown as Table 2:

TABLE 2

| A | B | = A + | 0 | 0 | = | 0 | D − C | + | 0 | B + C − A − D |
|---|---|---|---|---|---|---|---|---|---|---|
| C | D |  | C − A | C − A |  | 0 | D − C |  | 0 | 0. |

Figure 5:
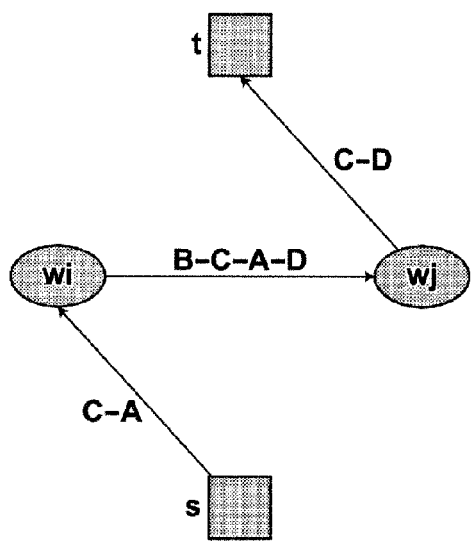
FIG. 5 is a diagram for explaining how a second-order energy is converted into a graph.

The relationship between Table 2 and the edges is discussed. The first term in Table 2 is a constant. The next two terms (the second to the third terms) depend on one of the variables $x_i$ and $x_j$ and correspond to the edges ($w_i$,s) and ($w_j$,t). The last term (the fourth term) depends on the two variables $x_i$ and $x_j$ and corresponds to the edge ($w_i$,$w_j$). FIG. 5 shows a graph representing the energies (weights) after conversion of Table 2. In order to obtain the minimum solution of a graph cut problem, it is necessary to ensure that the weight for each edge is nonnegative. This condition (B+C−A−D≥0) is called submodularity.

Converting the second-order energy into the graph shown in FIG. 5 and finding the minimum cut for separating the vertex s and the vertex t from each other in this manner allows finding the solution at high speed.

Next, graph cut in a case where classification into N classes (where N>2) is performed, where the number of labels assigned to sites is greater than two classes, is described. In this example, the labels are ordered in a row.

Figure 6:
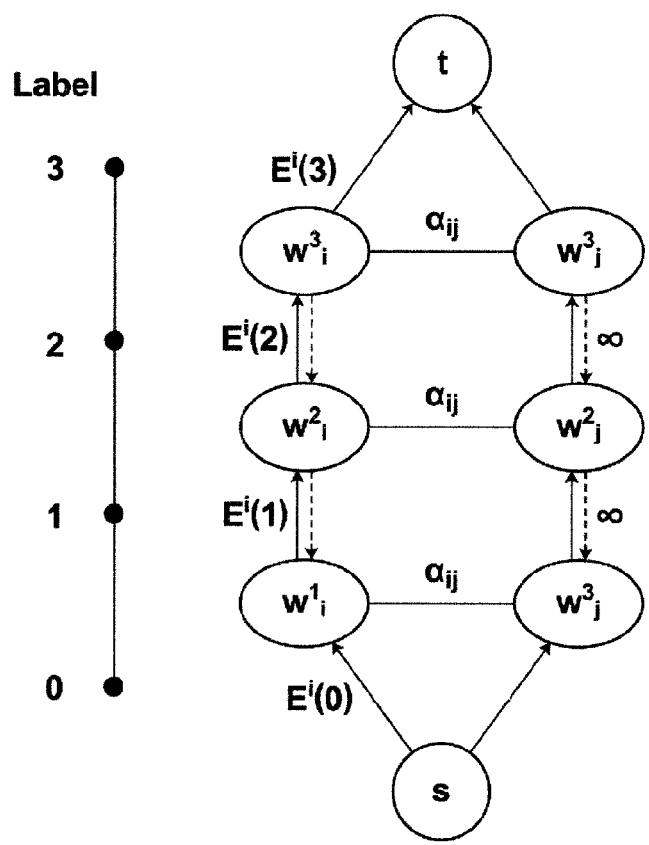
FIG. 6 is a diagram showing one example of a graph when classification into four classes is performed.

In the case where classification into N classes is performed, a graph including the vertices s and t is defined, as shown in FIG. 6, similarly to the case where classification into two classes is performed. FIG. 6 shows a graph in a case where classification into four labels is performed, for convenience. Between the vertices s and t, k layers (where k=N−1), which are boundaries between the labels, are provided, and a series of vertices $\{w^1_v, \ldots, w^k_v\}$ corresponding to sites v of pixels of the image data P are provided on each layer α (where α=1, . . . , k). Further, a graph connecting the series of vertices $\{w^1_v, \ldots, w^k_v\}$ to the vertex s and the vertex t is made to perform a graph cut operation.

In Non-Patent Literature 1, the graph cut operation is performed by making edges $(w^i_v, w^{i+1}_v)$ that connect the vertices on each of layers α=0, 1, . . . , i, i+1, . . . , k, and edges $(w^{i+1}_v, w^i_v)$ that connect the vertices on each of the layers α=1, . . . , i, i+1, . . . , k−1 in the opposite direction (shown by the dashed arrows in the drawing), as shown in FIG. 6 (where $w^0_v$ represents s and $w^{k+1}_v$ represents t, for the sake of simplicity.) In the course of $s=w^1_v, w^2_v, \ldots, w^{k-1}_v, w^k_v=t$, there must be at least one change from S to T. Therefore a weight of infinity is set for the latter edges $(w^{i+1}_v, w^i_v)$ to ensure that one of the edges of the series $s=w^1_v \rightarrow w^2_v \rightarrow \ldots \rightarrow w^{k-1}_v \rightarrow w^k_v=t$ is cut.

Figure 7:
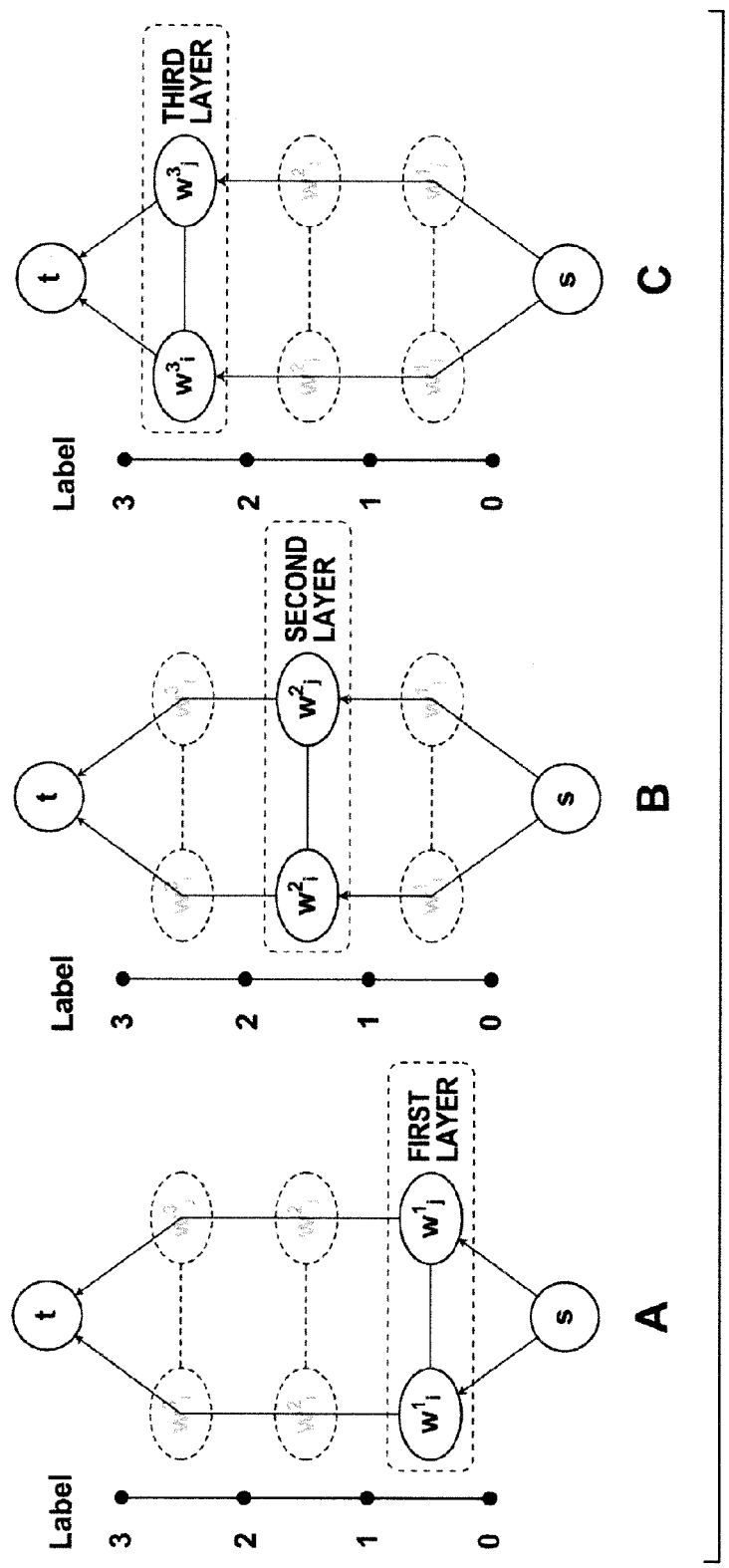
FIG. 7 is a diagram for explaining binary graphs.

As shown in FIG. 7, the graph shown in FIG. 6 can be replaced by binary labeling operations to perform classification into two classes where a virtual plane of each layer is the boundary, where, for each layer i, which of binary virtual labels each vertex $w^i_v$ belongs to is determined, and then which one of the N labels each vertex $w^i_v$ belongs to can be determined based on the results of the binary labeling of all the layers. It should be noted that the N labels are ordered labels. For example, if the condition of the labeling is the pixel value, the labels are assigned correspondingly to the order of ranges of pixel values such that the range of pixel values of pixels to which a label 0 is assigned is from 0 to 20, the range of pixel values of pixels to which a label 1 is assigned is from 15 to 35, the range of pixel values of pixels to which a label 2 is assigned is from 35 to 55, and so on.

Therefore the binary graph setting means 13 sets, for each layer i, a binary graph using the vertex s corresponding to the virtual label 0, the vertex t corresponding to the virtual label 1, and the vertices $w^i_v$ on the layer i, where the i-th layer i is the boundary between a label i−1 and a label i among the N labels, a class of the vertices $w^i_v$ on the layer i to which a label that is equal to or higher than i is assigned corresponds to the virtual label 0, and a class of the vertices $w^i_v$ on the layer i to which a label that is equal to or lower than i−1 is assigned corresponds to the virtual label 1.

The energy setting means 14 sets an energy depending on the pixel values of the pixels belonging to the virtual label 0 and pixel values of the pixels belonging to the virtual label 1 correspondingly to the edges of the binary graph of each layer.

The first-order energy is determined such that, if the pixel value of a pixel corresponding to the vertex $w^i_v$ is within the range of pixel values corresponds to the virtual label 0, the first-order energy for the edge $(s, w^i_v)$ is larger than the first-order energy for the edge $(w^i_v, t)$, and if the pixel value of a pixel corresponding to the vertex $w^i_v$ is within the range of pixel values corresponds to the virtual label 1, the first-order energy for the edge $(s, w^i_v)$ is smaller than the first-order energy for the edge $(w^i_v, t)$.

The second-order energy is determined such that the second-order energy when two pixels of adjacent vertices $w^i_i$ and $w^i_j$ on the virtual plane of the same layer i belong to different virtual labels is smaller than the second-order energy when two pixels of adjacent vertices $w^i_i$ and $w^i_j$ on the virtual plane of the same layer i belong to the same virtual label.

Figure 8:
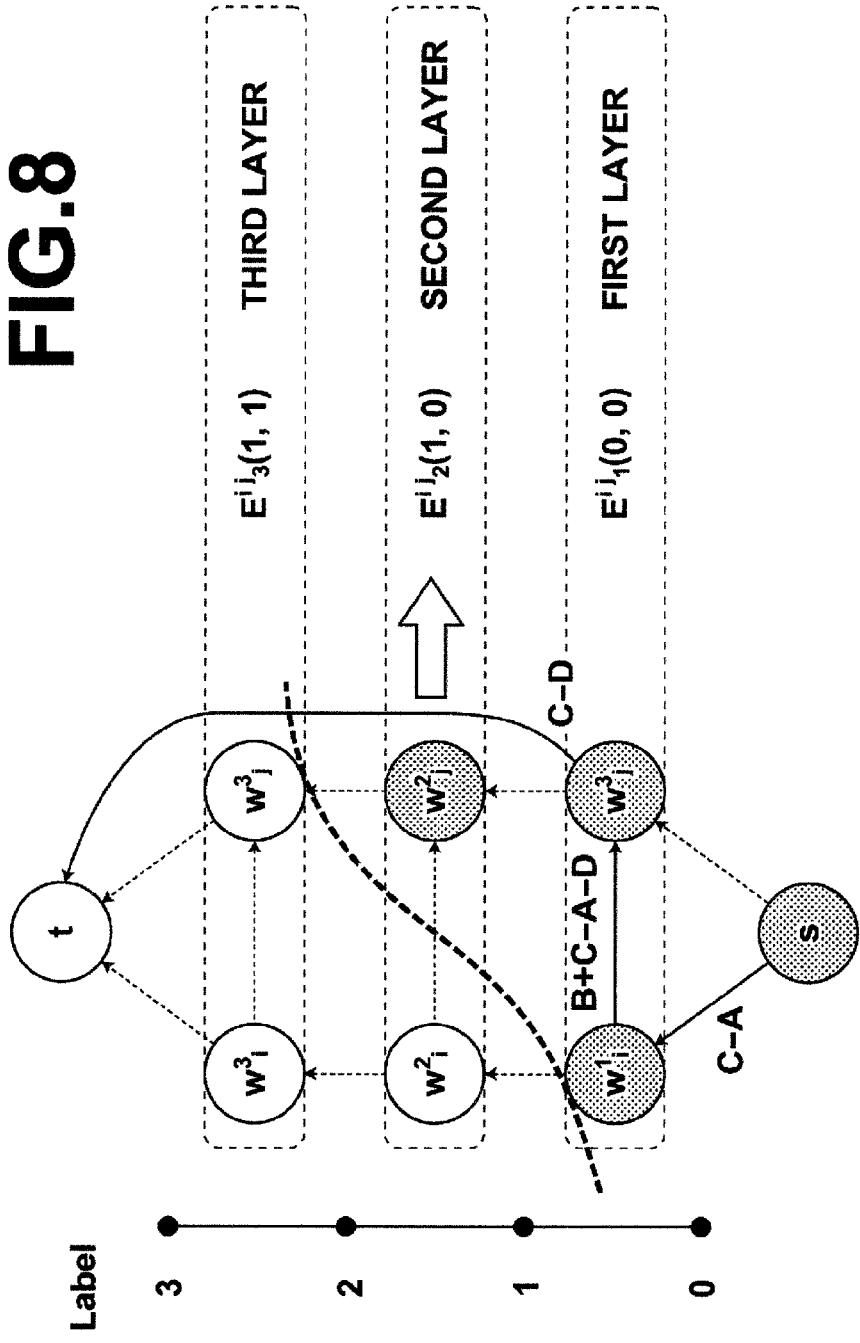
FIG. 8 is a diagram for explaining clustering using a binary graph.

Now, the binary graph and the energies are specifically described using FIGS. 7 and 8.

As shown at A in FIG. 7, the first-order energy $E^i_1(F(i,1))$ is set for the edge that connects each vertex $w^1_i$ on the virtual plane of the first layer to the vertex t and the edge that connects the vertex $w^1_i$ to the vertex s. Further, a graph representing the second-order energy $E^{ij}_1(F(i,1),F(j,1))$ is set using the vertex t, the vertex s, and the adjacent two vertices $w^1_i$ and $w^1_j$ on the virtual plane of the first layer. The F(i,1) takes a binary value of 0 or 1, where, if the label 0 is assigned to the site i (i.e., the site i belongs to the vertex s), the virtual label F(i,1)=0, and if a label other than the label 0 is assigned to the site i, the virtual label F(i,1)=1.

As shown at B in FIG. 7, the first-order energy $E^i_2(F(i,2))$ is set for the edge that connects each vertex $w^2_i$ on the virtual plane of the second layer to the vertex t and the edge that connects the vertex $w^2_i$ to the vertex s. Further, a graph representing the second-order energy $E^{ij}_2(F(i,2),F(j,2))$ is set using the vertex t, the vertex s, and the adjacent two vertices $w^2_i$ and $w^2_j$ on the virtual plane. The F(i,2) takes a binary value of 0 or 1, where, if a label equal to or lower than the label 1 is assigned to the site i, the virtual label F(i,2)=0, and if a label equal to or higher than the label 2 is assigned to the site i, the virtual label F(i,2)=1.

As shown at C in FIG. 7, the first-order energy $E^i_3(F(i,3))$ is set for the edge that connects each vertex $w^3_i$ on the virtual plane of the third layer to the vertex t and the edge that connects the vertex $w^3_i$ to the vertex s. Further, a graph representing the second-order energy $E^{ij}_3(F(i,3),F(j,3))$ is set using the vertex t, the vertex s, and the adjacent two vertices $w^3_i$ and $w^3_j$ on the virtual plane. The (F(i,3) takes a binary value of 0 or 1, where, if a label equal to or lower than the label 2 is assigned to the site i, the virtual label (F(i,3)=0, and if the label 3 is assigned to the site i, the virtual label (F(i,3)=1.

An energy E of the graph constructed as described above is calculated by adding the energies of the cuts of the binary graphs of the layers, and is expressed as Equation (3), where l is the layer number:

$$E = \sum_{l=1 \ldots N-1} E^i_l(F(wi, l)) + \sum_{i=1 \ldots N-1} E^{ij}_l(F(wi, l), F(wj, l)) \quad (3)$$

where $$F(wi, l) = \begin{cases} 0 & \text{if } wi \text{ belongs to a class lower than } l \\ 1 & \text{else} \end{cases}$$

With respect to the second-order energy, a minimum cut is found by converting the second-order energy into a binary graph for each layer i where the two vertices $w^i_i$ and $w^i_j$ are connected to the vertices s and t, using a technique to convert the second-order energy into a graph shown in Table 2 and FIG. 5. FIG. 8 shows a binary graph representing the second-order energy of the first layer.

The layer-by-layer labeling means 15 determines edges to be cut among the edges of the binary graph of each layer by performing a graph cut operation based on the energies depending on the pixel value of the pixel at each location v on the binary graph of the layer, and assigns one of the virtual label 0 and the virtual label 1 to each vertex $w^i_v$ on the layer.

Further, the label determining means 16 determines which of the N labels the pixel at each site v belongs to depending on which of the virtual label 0 and the virtual label 1 is assigned to each vertex $w^1_v$ (where 1=1, ..., k) on the first to the k-th layers, which corresponds to the same location v.

It should be noted that the labels are ordered, and, for each edge that connects different layers at the same site, a weight of infinity is set in the opposite direction (a sufficiently large value for the purpose of calculation such that the edge is not cut in the opposite direction) (see FIG. 6). This ensures making one cut among the plurality of layers at each site. The position of the cut is the class assigned to the site. In this manner, cuts are found such that the order is maintained when the energies for each layer are independently set.

As shown in FIG. 8, if the virtual label of the vertex $w^1_i$ on the first layer is 0 and the virtual labels of the vertices $w^2_i$ and $w^3_i$ on the second and the third layers are 1, the label of the site i is determined to be 1. If the virtual labels of the vertices $w^1_j$ and $w^2_j$ on the first and the second layers are 0 and the virtual label of the vertex $w^3_j$ on the third layer is 1, the label of the site j is determined to be 2.

As described above, use of the second-order energy allows taking the relationship between adjacent pixels into account in addition to the value of each pixel in the image data, and this allows classifying a pixel which has a pixel value close to that of plaque appearing in a blood vessel region into the blood vessel.

The display means 17 displays the classified regions in a recognizable manner. Specifically, the display means 17 displays the different classes in a distinguishable manner, such as displaying different classes in different colors, or performing image processing, such as volume rendering, to display only a blood vessel or to allow seeing plaque in the blood vessel.

Next, a graph-cut technique in a second embodiment, where a third-order energy is used to assign a finite number of labels to pixels in the image data, is described. The configuration of the classifying device 1 is substantially the same as that of the first embodiment, and only the labeling means 12 is described in detail.

The labeling means 12 minimizes the energy using the third-order energy. The energy function E is a sum of the first-order energy $E^i$ that is determined depending on the value of each pixel, the second-order energy $E^{ij}$ that is determined depending on the relationship between adjacent two pixels, and the third-order energy $E^{ijk}$ that is determined depending on the relationship among three consecutive pixels, as shown by Equation (4) below:

$$E(x) = \sum_i E^i(x_i) + \sum_{(i,j)} E^{ij}(x_i, x_j) + \sum_{(i,j,k)} E^{ijk}(x_i, x_j, x_k). \quad (4)$$

Now, a method to convert the third-order energy into a graph in a case of a binary image where each pixel Xi has a value of "0" or "1" is described. The first-order energy and the second-order energy are the same as those described above and a detailed description thereof is omitted.

Let the third-order energy when vertices $w_i$, $w_j$, and $w_k$ belong to S be $E^{ijk}(0,0,0)=A$, the third-order energy when the vertices $w_i$ and $w_j$ belong to S and the vertex $w_k$ belongs to T be $E^{ijk}(0,0,1)=B$, the third-order energy when the vertices $w_i$ and $w_k$ belong to T and the vertex $w_j$ belongs to S be $E^{ij}(0,1,0)=C$, the third-order energy when the vertex $w_i$ belongs to S and the vertices $w_j$ and $w_k$ belong to T be $E^{ijk}(0,1,1)=D$, the third-order energy when the vertex $w_i$ belongs to T and the vertices $w_j$ and $w_k$ belong to S be $E^{ijk}(1,0,0)=E$, the third-order energy when the vertices $w_i$ and $w_k$ belong to T and the vertex $w_j$ belongs to S be $E^{ij}(1,0,1)=F$, the third-order energy when the vertices $w_i$, $w_j$ belong to T and the vertex $w_k$ belongs to S be $E^{ijk}(1,1,0)=G$, and the third-order energy when the vertices $w_i$, $w_j$, and $w_k$ belong to T be $E^{ijk}(1,1,1)=H$. The energies A, B, C, D, E, F, G, and H are defined to reflect previous knowledge depending on the pixel values of the pixels corresponding to the vertices $w_i$, $w_j$, and $w_k$.

The third-order energy can be expressed as shown by Table 3:

TABLE 3

| $E^{ijk}=$ | $E^{ijk}(0, 0, 0)$ | $E^{ijk}(0, 0, 1)$ | = | A | B |
|---|---|---|---|---|---|
| | $E^{ijk}(0, 1, 0)$ | $E^{ijk}(0, 1, 1)$ | | C | D |
| | $E^{ijk}(1, 0, 0)$ | $E^{ijk}(1, 0, 1)$ | | E | F |
| | $E^{ijk}(1, 1, 0)$ | $E^{ijk}(1, 1, 1)$ | | G | H. |

Let P=A+D+F+G−B−C−E−H.

(1) First, conversion of the third-order energy into a graph when 0≤P is described. Let P1=F−B,
P2=G−E,
P3=D−C,
P12=C+E−A−G,
P23=B+C−A−D, and
P31=B+E−A−F.

Then, Table 3 can be rewritten as Table 4. Further, if this energy is submodular for all combinations of (i,j), (j,k), and (k,i), P23, P31, and P12 are nonnegative.

TABLE 4

| A | B | = | A | + | 0 | 0 | + | 0 | 0 | + | 0 | $P_3$ | + | 0 | $P_{23}$ | + | 0 | 0 | + | 0 | 0 | + | P | P | − | P |
|---|---|---|---|---|---|---|---|---|---|---|---|---|---|---|---|---|---|---|---|---|---|---|---|---|---|---|
| C | D | | | | 0 | 0 | | $P_2$ | $P_2$ | | 0 | $P_3$ | | 0 | 0 | | 0 | 0 | | $P_{12}$ | $P_{12}$ | | P | P | | |
| E | F | | | | $P_1$ | $P_1$ | | 0 | 0 | | 0 | $P_3$ | | 0 | $P_{23}$ | | $P_{31}$ | 0 | | 0 | 0 | | P | P | | |
| G | H | | | | $P_1$ | $P_1$ | | $P_2$ | $P_2$ | | 0 | $P_3$ | | 0 | 0 | | $P_{31}$ | 0 | | 0 | 0 | | P | P | | |

The relationship between Table 4 and the edges is discussed. The first term and the last term in Table 4 are constants and have no corresponding edges. The next three terms (the second to the fourth terms) depend on one of the variables $x_i$, $x_j$, and $x_k$, and correspond to edges $(w_i,s)$, $(w_j,s)$, and $(w_k,s)$ having weights P1, P2, and P3, respectively. The following three terms (the fifth to the seventh terms) depend on two of the variables $x_i$, $x_j$, and $x_k$, and correspond to edges $(w_j,w_k)$, $(w_k,w_i)$, and $(w_i, w_j)$ having weights P23, P31, and P12, respectively.

Figure 9:
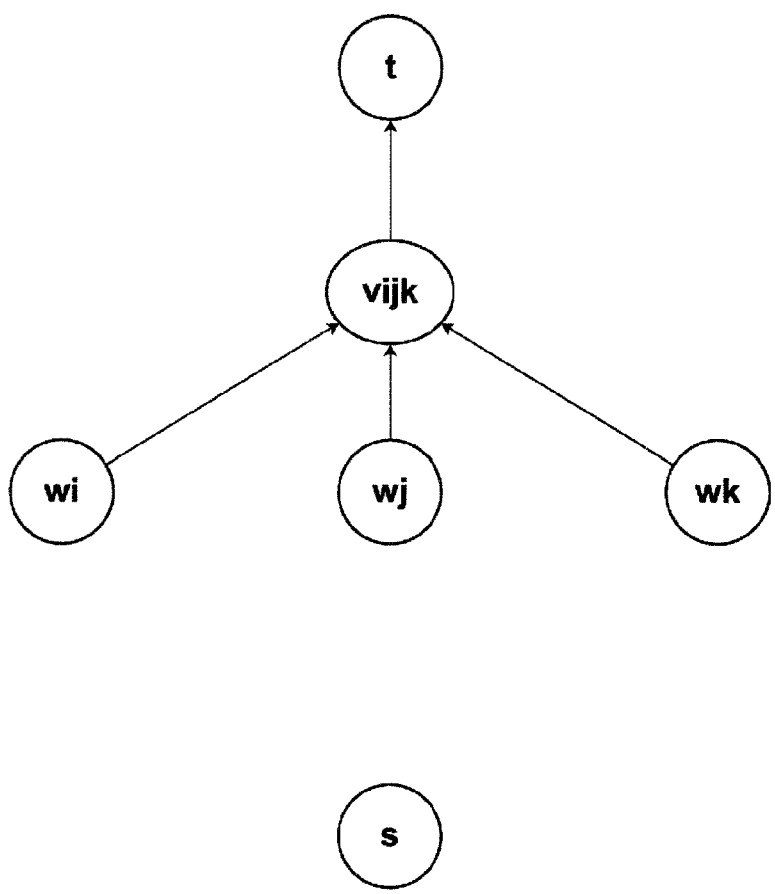
FIG. 9 is a diagram for explaining how a third-order energy is converted into a graph (first example)
Figure 10:
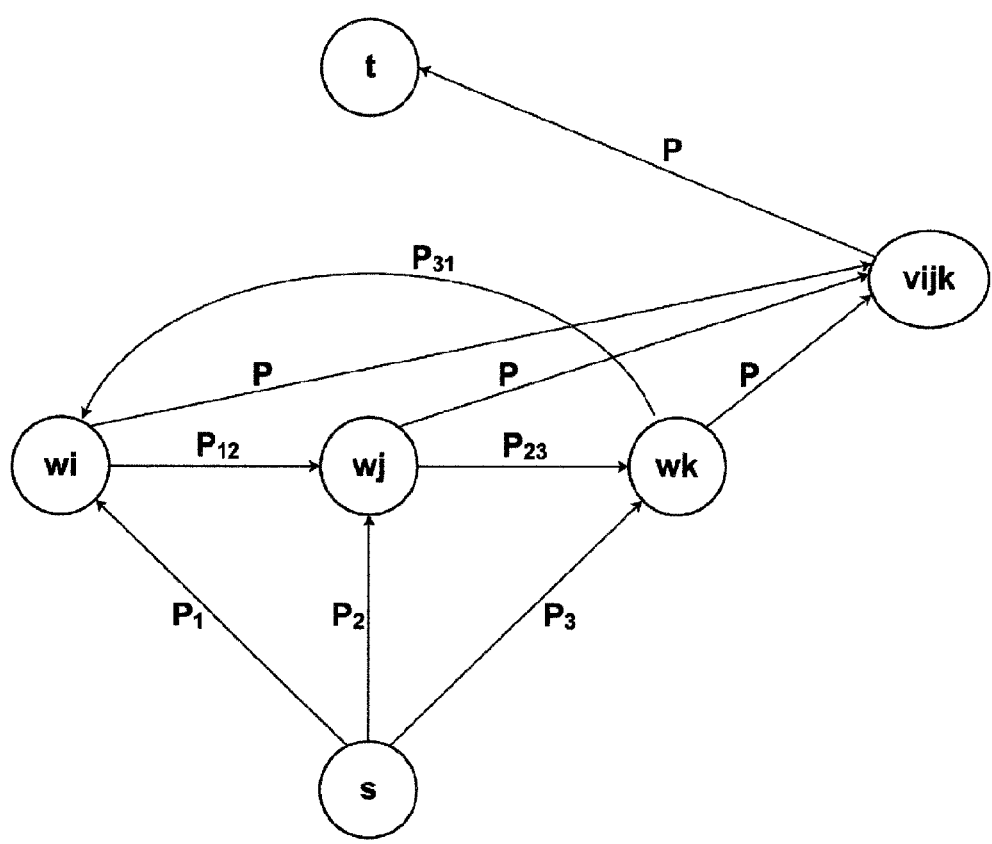
FIG. 10 is a diagram showing one example of a graph obtained by converting the third-order energy (first example)

The eighth term corresponds to four edges $(w_i,v_{ijk})$, $(w_j,v_{ijk})$, $(w_k,v_{ijk})$, and $(v_{ijk},t)$ that connect the individual vertices to an auxiliary vertex $v_{ijk}$ added, as shown in FIG. 9, and have a weight P. The auxiliary vertex and the four edges satisfy the eighth term (see Non-Patent Literature 2 for details). FIG. 10 shows a graph that represents the relationships among all the weights and the edges.

(2) Next, conversion of the third-order energy into a graph when 0>P is described. Let P1=C−G,
P2=B−D,
P3=E−F,
P32=F+G−E−H,
P13=D+G−C−H, and
P21=D+F−B−H.

Then, Table 3 can be rewritten as Table 5:

TABLE 5

| A | B | = | H | + | $P_1$ | $P_1$ | + | $P_2$ | $P_2$ | + | $P_3$ | 0 | + | 0 | 0 | + | 0 | $P_{13}$ | + | 0 | 0 | + | 0 | −P | + | P. |
|---|---|---|---|---|---|---|---|---|---|---|---|---|---|---|---|---|---|---|---|---|---|---|---|---|---|---|
| C | D | | | | $P_1$ | $P_1$ | | 0 | 0 | | $P_3$ | 0 | | $P_{32}$ | 0 | | 0 | $P_{13}$ | | 0 | 0 | | −P | −P | | |
| E | F | | | | 0 | 0 | | $P_2$ | $P_2$ | | $P_3$ | 0 | | 0 | 0 | | 0 | 0 | | $P_{21}$ | $P_{21}$ | | −P | −P | | |
| G | H | | | | 0 | 0 | | 0 | 0 | | $P_3$ | 0 | | $P_{32}$ | 0 | | 0 | 0 | | 0 | 0 | | −P | −P | | |

Figure 11:
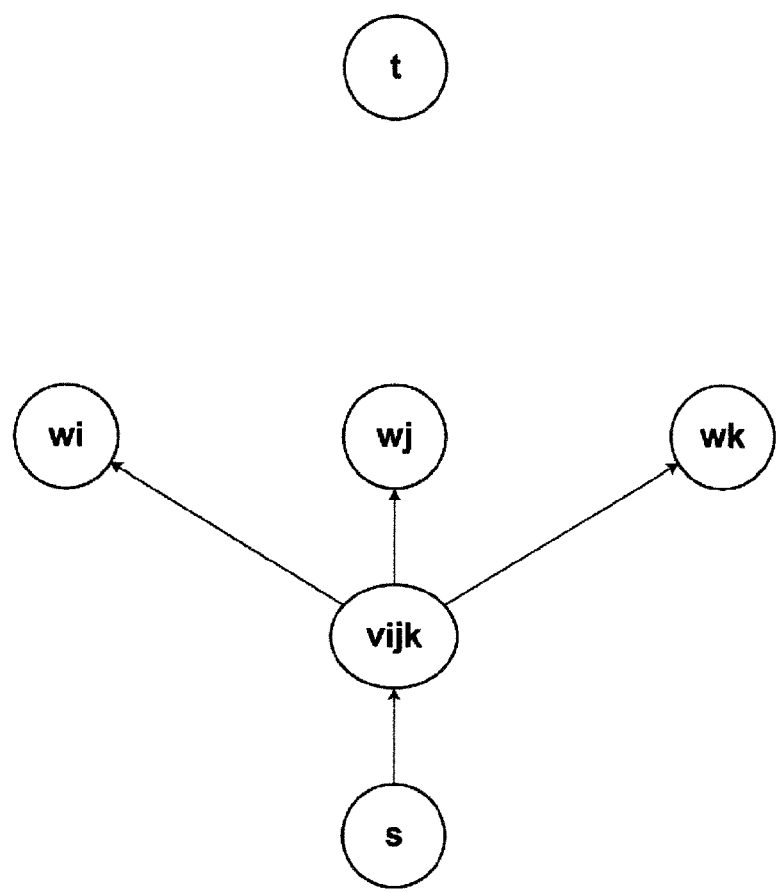
FIG. 11 is a diagram for explaining how a third-order energy is converted into a graph (second example)

The eighth term in Table 5 corresponds to four edges ($w_i, v_{ijk}$), ($w_j, v_{ijk}$), ($w_k, v_{ijk}$), and ($v_{ijk}$, s) that connect the individual vertices to an auxiliary vertex $v_{ijk}$ added, as shown in FIG. 11, and have a weight P (see Non-Patent Literature 2 for details). When the edges and the weights are associated with each other similarly to the case (1), a graph that represents the relationships among all the edges and the weights is as shown in FIG. 12.

Figure 12:
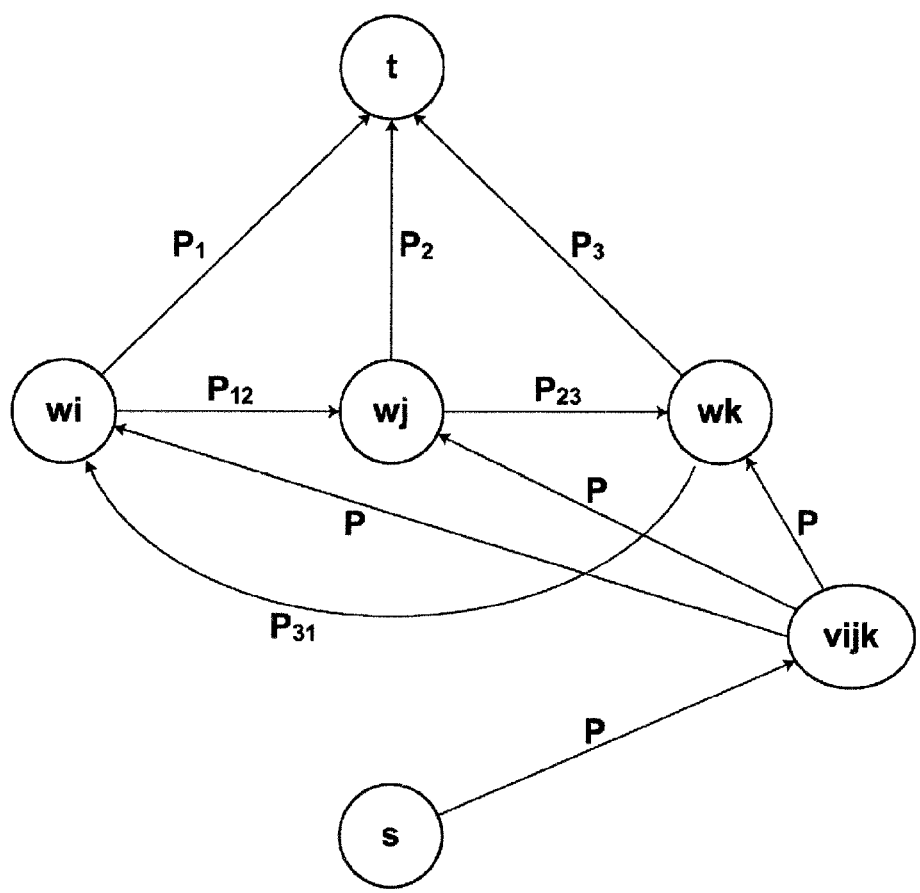
FIG. 12 is a diagram showing one example of a graph obtained by converting the third-order energy (second example)

Converting the third-order energy into the graph as shown in FIG. 10 or 12 and finding a minimum cut that separates the vertex s and the vertex t from each other in this manner allows finding the solution at high speed.

Figure 13:
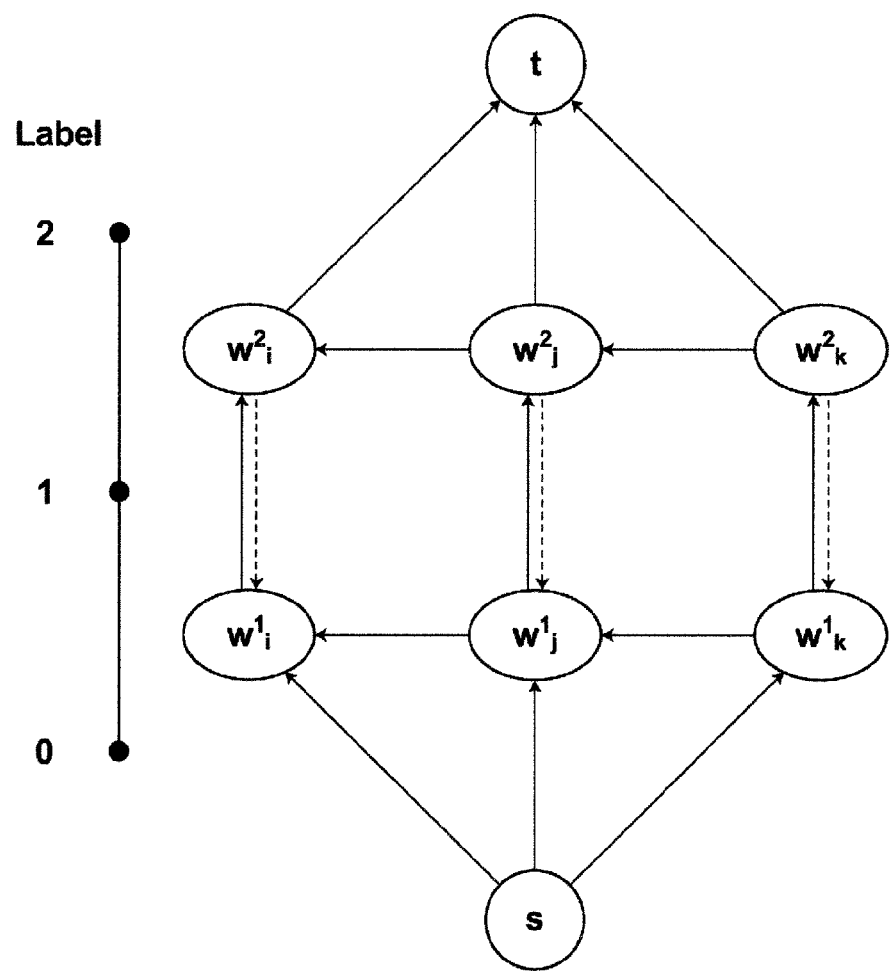
FIG. 13 is a diagram showing one example of a graph when classification into three classes is performed.

Next, the third-order energy in a case where classification into N classes (where N>2), where the number of labels assigned to the sites is greater than two, is performed is described. FIG. 13 shows a graph in a case where classification into three labels is performed.

Figure 14:
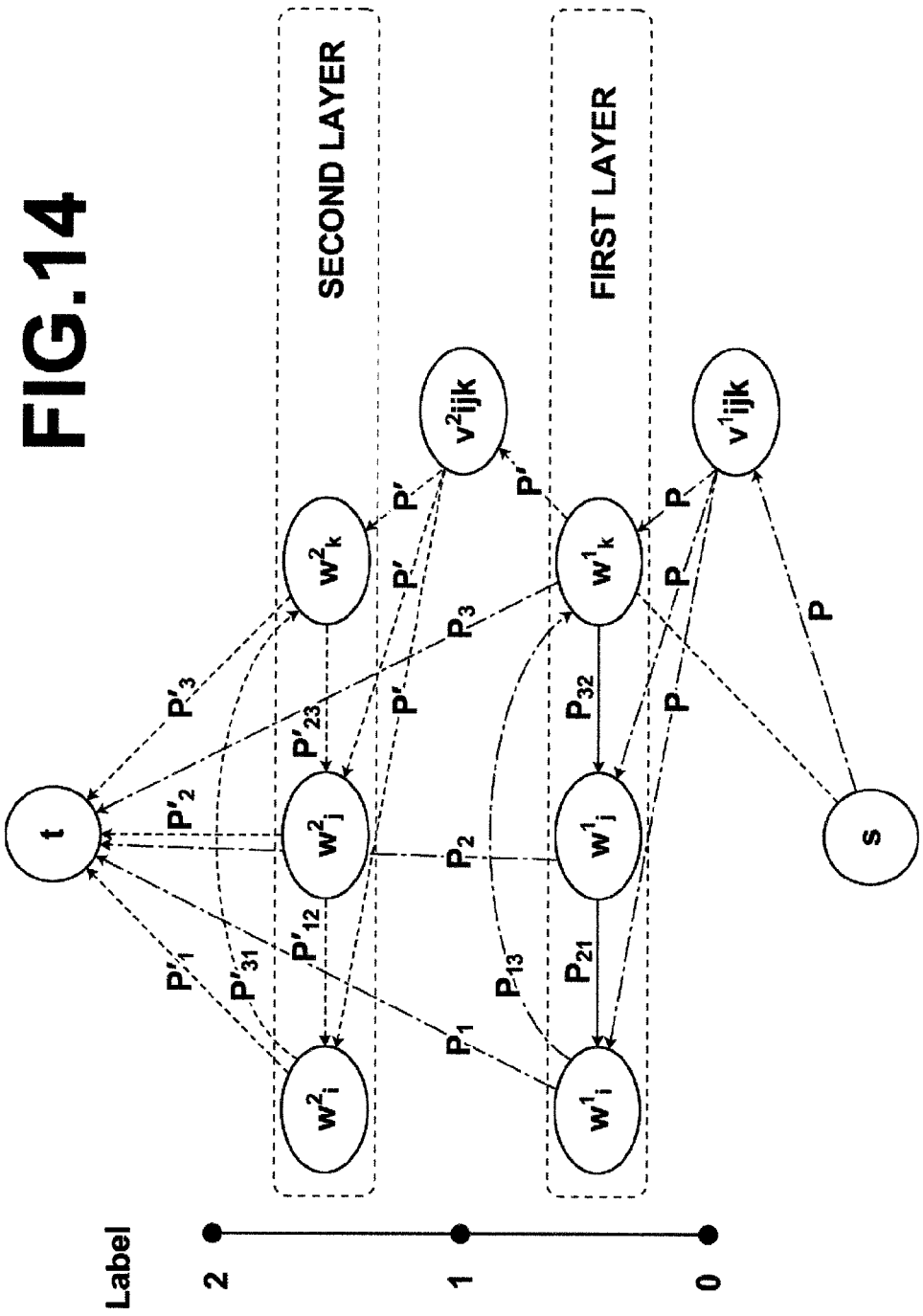
FIG. 14 is a diagram for explaining a graph of a third-order energy when classification into three classes is performed.

As shown in FIG. 14, the graph shown in FIG. 13 can be replaced with binary labeling operations to perform classification into two classes where a virtual plane of each layer is the boundary, where, for each layer i, a binary label for each vertex $w^i_v$ is determined, and then which one of N labels each vertex $w^i_v$ belongs to is determined based on the results of labeling of all the layers.

Therefore the binary graph setting means 13 makes, for each layer i, a graph representing the third-order energy using the vertex s corresponding to the virtual label 0, the vertex t corresponding to the virtual label 1, and three consecutive vertices $w^i_i$, $w^i_j$, and $w^i_k$ among the vertices $w^i_v$ on the layer i, where the i-th layer i is the boundary between a label i−1 and a label i among the N labels, a class of the vertices $w^i_v$ on the layer i to which a label that is equal to or higher than i is assigned corresponds to the virtual label 0, and a class of the vertices $w^i_v$ on the layer i to which a label that is equal to or lower than i−1 is assigned corresponds to the virtual label 1. A graph of the third-order energy made by using the technique used to convert the third-order energy into the graph shown in Table 5 and FIG. 12 and adding an auxiliary vertex $v^i_{ijk}$ for each layer i is shown in FIG. 14.

The energy E of the graph constructed as described above is calculated by adding the energies of the cuts of the binary graphs of the layers, and is expressed as Equation (5), where l is the layer number:

$$E = \sum_{l=1 \ldots N-1} E^i_l(F(wi, l)) + \sum_{l=1 \ldots N-1} E^{ij}_l(F(wi, l), F(wj, l)) + \quad (5)$$

$$\sum_{l=1 \ldots N-1} E^{ijk}_l(F(wi, l), F(wj, l), F(wk, l))$$

where $$F(wi, l) = \begin{cases} 0 & \text{if } wi \text{ belongs to a class lower than } l \\ 1 & \text{else} \end{cases}.$$

The energy setting means 14 sets the third-order energy that is determined to correspond to a feature of the image represented by the pixels of the three adjacent vertices $w^i_i$, $w^i_j$, and $w^i_k$ on the virtual plane of the same layer i. Specifically, vertices corresponding to three consecutive pixels in the vertical direction, the horizontal direction, or the diagonal direction on the image are selected. The three adjacent vertices are selected on each of the first layer and the second layer, and then $2^3$ different energies are determined based on the pixel values of the pixels corresponding to the three vertices.

The $2^3$ different energies refer to the elements (A, B, C, D, E, F, G, and H) of the matrix shown in Table 3. The actual pixel value of each pixel on the image is compared with distributions of pixel values of pixels belonging to the virtual label 0 and the virtual label 1, and a smaller energy is set for a combination of the labels with higher possibility. With respect to the third-order energy, locations of the labels 0 and 1 on the image are also important. For example, it is not likely that the labels abruptly change between adjacent pixels, such as "010" or "101", and a large energy is set for such combinations. Further, a small energy can be set when it is highly likely that the same label 0 or 1 is assigned to the three vertices based on second-order differential, etc., of the pixel values of the three vertices.

The graphs and the energies with respect to the first-order energy and the second-order energy set by the binary graph setting means 13 and the energy setting means 14 are the same as those of the first embodiment and a detailed description thereof is omitted.

Then, the layer-by-layer labeling means 15 performs a graph cut operation based on the energies depending on the pixel value of the pixel at each site v on the binary graph of each layer to determine edges to be cut among the edges of the binary graph of each layer to assign one of the virtual label 0 and the virtual label 1 to each vertex $w^i_v$ on each layer.

Further, the label determining means 16 determines which of the N labels the pixel at each site v belongs to depending on which of the virtual label 0 and the virtual label 1 is assigned to each vertex $w^1_v$ (where l=1, . . . , k) on the first to the k-th layers, which corresponds to the same site v.

The display means 17 displays the classes in a distinguishable manner, such as displaying different classes in different colors, or performing image processing, such as volume rendering.

Figure 15:
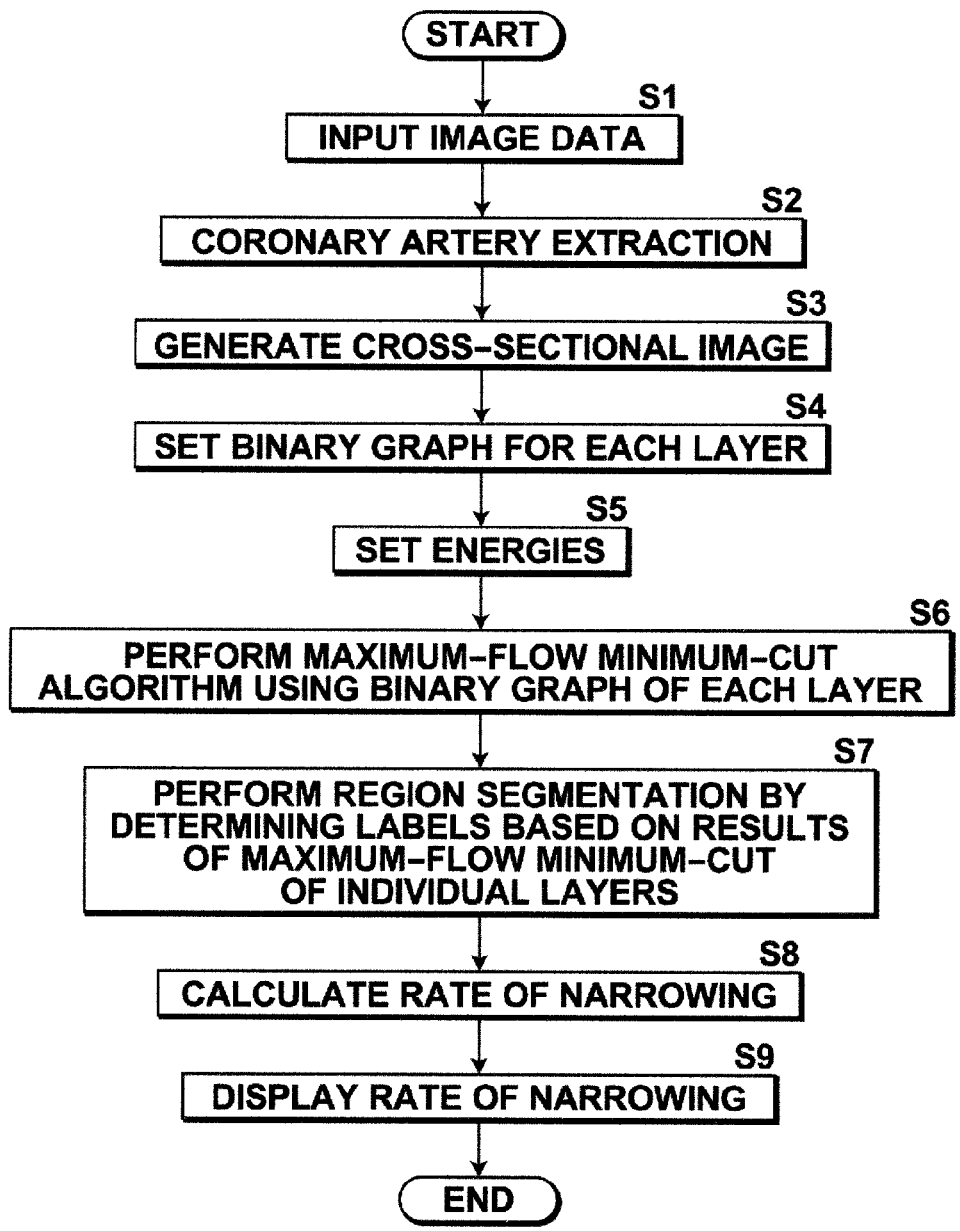
FIG. 15 is a flow chart showing the flow of a process for calculating a rate of narrowing of a coronary artery.

Next, a process to calculate a rate of narrowing of a coronary artery from a contrast enhanced CT image of a heart using the third-order energy is described. FIG. 15 is a flow chart showing the flow of the process to calculate a rate of narrowing performed by the classifying device 1. As shown in FIG. 16, the image of the coronary artery can be classified into regions of three classes including the inner diameter, the outer diameter, and the background. The inner diameter (excluding plaque) as used herein refers to a region with normal blood flow, and the outer diameter as used herein refers to a blood vessel region including plaque. The rate of narrowing is calculated as:

Inner diameter/Outer diameter, where a higher rate of narrowing indicates more serious narrowing.

First, the inputted image data receiving means 11 receives inputted image data P representing an image of a coronary artery. The inputted image data P is stored in the storage device of the classifying device 1 (S1).

Then, as pre-processing, the center line and the center coordinates of the coronary artery are found from the image data P using a known coronary artery extraction technique (S2). Based on the thus given center coordinates, a cross-sectional image of the blood vessel (artery) is obtained (S3). The obtained cross-sectional image is segmented into the three regions including the background, the inner diameter, and the outer diameter. Since the inner diameter of the blood vessel is a region included in the outer diameter, and the outer diameter is a region included in the background, the three classes are ordered in a row. Let the background region be the class 0, the outer diameter be the class 1, and the inner diameter be the class 2.

The labeling means 12 sets, on virtual planes of the first layer and the second layer, vertices $w^1_v$ and $w^2_v$ corresponding to the pixels in the image data. Further, the binary graph setting means 13 sets a binary graph including the vertices $w^1_v$ on the virtual plane of the first layer, the virtual label 0, and the virtual label 1, and a binary graph including the vertices $w^2_v$ on the virtual plane of the second layer, the virtual label 0, and the virtual label 1 (S4).

Further, the first-order energy, the second-order energy, and the third-order energy are set on each of the binary graphs of the first layer and the second layer (S5).

The first-order energy of each binary graph is determined depending on the luminance value (pixel value) of the pixel at each site. In a case where the luminance values are distributed as shown in FIG. 17, a mean value of the luminance values of the background area around the blood vessel in the cross-sectional image is set as an estimated value A1 of the class of background, and a mean value of the luminance values at the center area of the blood vessel is set as an estimated value A2 of the class of inner diameter.

The binary graph of the first layer between the class 0 and the class 1 performs classification into the class 0 corresponding to the background region and the classes 1 and 2 corresponding to the other regions. Therefore the energy setting means 14 sets a smaller first-order energy for the edge that connects each vertex $w^1_v$ on the first layer to the vertex s when the pixel corresponding to the vertex $w^1_v$ has a luminance value that is closer to the estimated value A1 of the class of background, and sets a large energy for the edge that connects the vertex $w^1_v$ on the first layer to the vertex t.

The binary graph of the second layer between the class 1 and the class 2 performs classification into the class 2 corresponding to the inner diameter and the classes 0 and 1 corresponding to the other regions. Therefore the energy setting means 14 sets a smaller first-order energy for the edge that connects each vertex $w^2_v$ on the second layer to the vertex t when the pixel corresponding to the vertex $w^2_v$ has a luminance value that is closer to the estimated value A2 of the class of inner diameter, and sets a large energy for the edge that connects the vertex $w^2_v$ on the second layer to the vertex s. When the pixel corresponding to the vertex $w^2_v$ has a luminance value that is far from the estimated value A2 of the class of inner diameter, the energies are set in the opposite manner.

Next, how the second-order energy is set is described. With respect to the binary graph of the first layer, a small second-order energy is set when the luminance values of adjacent two vertices $w^1_v$ are classified into the class of background and the class of outer diameter by comparison with an estimated value B1, which is the boundary between the class of background and the class of outer diameter, and a large second-order energy is set when both the luminance values of adjacent two vertices $w^1_v$ are classified into the class of background or the class of outer diameter by comparison with the estimated value B1. Based on the luminance values of the pixels corresponding to the two vertices, $2^2$ different energies are determined to set the second-order energy for each edge of the binary graph of the first layer.

Similarly, with respect to the binary graph of the second layer, a small second-order energy is set when the luminance values of adjacent two vertices $w^2_v$ are classified into the class of inner diameter and the class of outer diameter by comparison with an estimated value B2, which is the boundary between the class of outer diameter and the class of inner diameter, and a large second-order energy is set when both the luminance values of the adjacent two vertices $w^2_v$ are classified into the class of inner diameter or the class of outer diameter by comparison with the estimated value B2. Based on the luminance values of the pixels corresponding to the two vertices, $2^2$ different energies are determined (see Table 1), and the second-order energy is set for each edge of the binary graph of the second layer according to the $2^2$ different energies.

Next, how the third-order energy is set is described. Three adjacent vertices are selected on each of the first layer and the second layer (three adjacent vertices in the vertical direction, the horizontal direction, or the diagonal direction are selected), and $2^3$ different energies (see Table 3) are determined based on the luminance values of pixels corresponding to the three vertices. In the case where the distribution of luminance values of each class is estimated in advance, the value of each pixel is compared with the luminance values. If the actual pixel value is an intermediate luminance value of the luminance values, it is highly possible that the class changes at the position. Therefore a smaller value is set when the position at which the class changes is closer to the intermediate position of the class estimated in advance. As sated previously, the locations of the labels 0 and 1 on the image is also important with respect to the third-order energy. For example, it is not likely that the labels abruptly change between adjacent pixels, such as "010" or "101", and a large energy is set for such combinations. Further, a small energy can be set when it is highly likely that the same label 0 or 1 is assigned to the three vertices based on second-order differential, etc., of the pixel values of the three vertices. According to the thus determined $2^3$ different energies, the third-order energy is set for each edge of the binary graphs of the first and the second layers.

The layer-by-layer labeling means 15 performs a maximum-flow minimum-cut algorithm for each layer to label each vertex on the layer with the virtual label 0 or the virtual label 1 (S6). Then, the label determining means 16 determines the label of each site based on the virtual labels assigned to the vertices $w^1_v$ on the first layer and the vertices $w^2_v$ on the second layer, and the region segmentation is finished (S7).

Further, the rate of narrowing (=inner diameter/outer diameter) is calculated from the outer diameter and the inner diameter obtained by the region segmentation (S8). The display means 17 displays the rate of narrowing together with a volume-rendered image (S9).

As described in detail above, the energy functions set according to this technique satisfy the submodular condition, and allow finding the minimum solution at high speed. Further, setting the third-order energy allows highly accurate region segmentation.

Next, a graph-cut technique in a third embodiment, where a fourth-order energy is used to assign a finite number of labels to pixels in the image data, is described. The configuration of the classifying device 1 is substantially the same as that of the first embodiment, and only the labeling means 12 is described in detail.

The labeling means 12 minimizes the energy using the fourth-order energy. The energy function E is a sum of the first-order energy $E^i$ that is determined depending on a value of each pixel, the second-order energy $E^{ij}$ that is determined depending on the relationship between adjacent two pixels, and the fourth-order energy $E^{ijkl}$ that is determined depending on the relationship among four consecutive pixels, as shown by Equation (6) below:

$$E(x_i, \ldots, x_n) = \sum_i E^i(x_i) + \sum_{(i,j)} E^{ij}(x_i, x_j) + \sum_{(i,j,k,l)} W^{ijkl}(x_i, x_j, x_k, x_l). \quad (6)$$

Now, a method to convert the fourth-order energy into a graph in a case of a binary image where each pixel Xi has a value of "0" or "1" is described. The first-order energy and the second-order energy are the same as those described above and a detailed description thereof is omitted.

Figure 18:
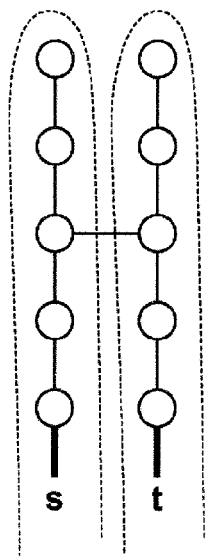
FIG. 18 is a diagram for explaining partitioning using a fourth-order energy.
Figure 19:
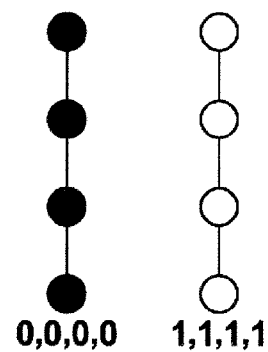
FIG. 19 is a diagram showing four pixels to be classified into the same class.

The fourth-order energy can be used when classification is performed such that selected four pixels are classified into the same class. For example, the fourth-order energy is used for an object having a linear stricture. Blood vessels, such as arteries or veins, often extend linearly, and it is preferred that all the pixels along a straight line of a certain length belong to the same class, as shown in FIG. 18. Namely, in a case where four pixels, as shown in FIG. 19, are classified as $(x_i, x_j, x_k, x_l)=(0,0,0,0)$ or $(1,1,1,1)$, the fourth-order energy $E^{ijkl}(x_i, x_j, x_k, x_l)$ is small. Therefore 0 is set for the fourth-order energy $E^{ijkl}$ of the cases of $E^{ijkl}(0,0,0,0)$ and $E^{ijkl}(1,1,1,1)$, and a constant weight a (>0) is set for the other cases.

TABLE 6

| $E^{ijkl} =$ | $E^{ijkl}(0, 0, 0, 0)$ | $E^{ijkl}(0, 0, 0, 1)$ | $E^{ijkl}(1, 0, 0, 0)$ | $E^{ijkl}(1, 0, 0, 1)$ | = | 0 | a | a | a |
|---|---|---|---|---|---|---|---|---|---|
| | $E^{ijkl}(0, 0, 1, 0)$ | $E^{ijkl}(0, 0, 1, 1)$ | $E^{ijkl}(1, 0, 1, 0)$ | $E^{ijkl}(1, 0, 1, 1)$ | | a | a | a | a |
| | $E^{ijkl}(0, 1, 0, 0)$ | $E^{ijkl}(0, 1, 0, 1)$ | $E^{ijkl}(1, 1, 0, 0)$ | $E^{ijkl}(1, 1, 0, 1)$ | | a | a | a | a |
| | $E^{ijkl}(0, 1, 1, 0)$ | $E^{ijkl}(0, 1, 1, 1)$ | $E^{ijkl}(1, 1, 1, 0)$ | $E^{ijkl}(1, 1, 1, 1)$ | | a | a | a | 0 |

The energy $E^{ijkl}$ written in a pseudo-Boolean expression is as follows (see Japanese Unexamined Patent Publication No. 2010-287091, etc., for the pseudo-Boolean expression):

$$E^{ijkl} = a(1-x_i x_j x_k x_l - (1-x_i)(1-x_j)(1-x_k)(1-x_l)).$$

In the above equation, the first term is a constant. The second term is a third- or higher order term, which can be converted into a second-order term according to the equations below, as taught in the above-mentioned document, where w is a newly added binary variable. If $x_i$, $x_j$, and $x_k$ in the function after conversion give the minimum value, they also give the minimum value in the function before conversion. If the second term is a fourth-order term, it is converted according to Equation (7):

$$-x_i x_j x_k x_l = \min_{w \in \{0,1\}} -w(x_i + x_j + x_k + x_l - 3). \quad (7)$$

Similarly, a different order term can be handled by adding a variable(s), as shown by Equation (8):

$$-x_1 \ldots x_n = \min_{w \in \{0,1\}} -w(x_1 \ldots x_n - (n-1)). \quad (8)$$

Then, the third term in the above equation can be converted into a second-order term according to Equation (9):

$$-(1-x_i)(1-x_j)(1-x_k) = \min_{w \in \{0,1\}} (1-w)(x_i + x_j + x_k - 1). \quad (9)$$

If the third term is a fourth-order term, it can be converted as shown by Equation (10):

$$-(1-x_i)(1-x_j)(1-x_k)(1-x_l) = \min_{w \in \{0,1\}} (1-w)(x_i + x_j + x_k + x_l - 1). \quad (10)$$

Similarly, a different order term can be handled by adding a variable(s), as shown by Equation (11):

$$-(1-x_1) \ldots (1-x_n) = \min_{w \in \{0,1\}} (1-w)(x_1 \ldots x_n - 1). \quad (11)$$

Figure 20:
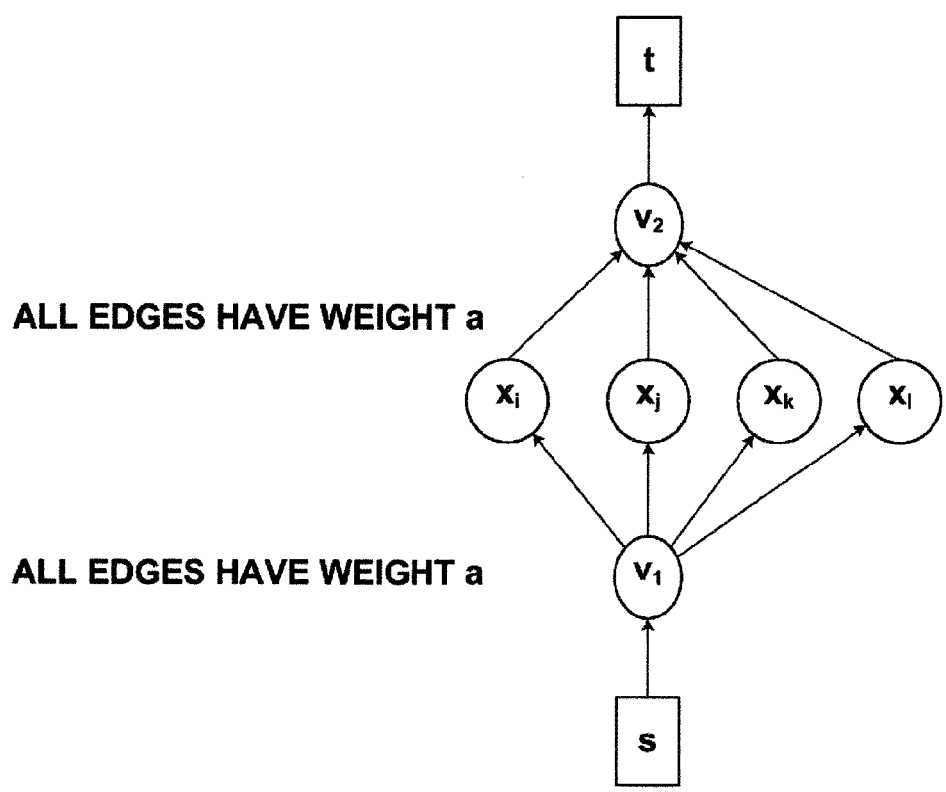
FIG. 20 is a diagram for explaining how a fourth-order energy is converted into a graph.

This can be expressed in the form of a graph, as shown in FIG. 20, which includes virtual vertices $v_1$ and $v_2$ added between vertices $x_i$, $x_j$, $x_k$, and $x_l$ corresponding to four pixels and the vertex s, and between the vertices $x_i$, $x_j$, $x_k$, and $x_l$ corresponding to the four pixels and the vertex t, respectively, edges that connect the vertices $x_i$, $x_j$, $x_k$, and $x_l$ to the virtual vertex $v_1$, edges that connect the vertices $x_i$, $x_j$, $x_k$, and $x_l$ to the virtual vertex $v_2$, an edge that connects the virtual vertex $v_1$ to the vertex s, and an edge that connects the virtual vertex $v_2$ to the vertex t. Each edge has the weight a.

By converting the fourth-order energy into the graph shown in FIG. 20 to find a minimum cut that separates the vertices s and t from each other in this manner, the solution can be obtained at high speed.

Further, in a case where classification is performed such that four or more pixels are classified into the same class and the number of N classes is more than two (where N>2), the process can be replaced by binary labeling operations and which of the N labels each vertex belongs to can be determined similarly to the previously described case where the third-order energy is set.

The binary graph setting means 13 makes, for each layer i, a graph representing the fourth-order energy using the vertex s corresponding to the virtual label 0, the vertex t corresponding to the virtual label 1, and four vertices $w^i_j$, $w^i_j$, $w^i_k$, and $w^i_l$ among the vertices $w^i_v$ on the layer i, where the i-th layer i is the boundary between a label i−1 and a label i among the N labels, a class of the vertices $w^i_v$ on the layer i to which a label that is equal to or higher than i is assigned corresponds to the virtual label 0, and a class of the vertices $w^i_v$ on the layer i to which a label that is equal to or lower than i−1 is assigned corresponds to the virtual label 1.

As shown in FIG. 21, with respect to the fourth- or a higher order energy that is determined depending on whether all of arbitrary four or more vertices in the same layer belong to the virtual label 0 or the virtual label 1, edges that connect the four vertices $w^i_j$, $w^i_j$, $w^i_k$, $w^i_l$ to the vertex s and the vertex t via the virtual vertex $v^i_1$ and the virtual vertex $v^i_2$, respectively, are set for each layer. While FIG. 21 shows a fourth-order graph for the first layer, a similar fourth-order graph is made for the second layer.

The energy E of the graph constructed as described above is calculated by adding the energies of the cuts of the binary graphs of the layers, and is expressed as Equation (12), where L is the layer number:

$$E = \sum_{L=1...N-1} E^i_L(F(wi, L)) + \sum_{L=1...N-1} E^{ij}_L(F(wi, L), F(wj, L)) + \sum_{L=1...N-1} E^{ijkl}_L(F(wi, L), F(wj, L), F(wk, L), F(wl, L)) \quad (12)$$

where $$F(wi, L) = \begin{cases} 0 & \text{if } wi \text{ belongs to a class lower than } L \\ 1 & \text{else} \end{cases}$$

The energy setting means 14 sets the fourth-order energy that is determined to correspond to a feature of the image represented by the pixels of the four consecutive vertices $w^i_j$, $w^i_j$, $w^i_k$, and $w^i_l$ on the virtual plane of the same layer i. Specifically, vertices corresponding to four consecutive pixels in the vertical direction, the horizontal direction, or the diagonal direction on the image are selected. The four vertices are selected on each of the first layer and the second layer, and energies corresponding to the four vertices are determined as shown by Table 6.

The graphs and the energies with respect to the first-order energy and the second-order energy set by the binary graph setting means 13 and the energy setting means 14 are the same as those in the first embodiment and a detailed description thereof is omitted.

Subsequently, the layer-by-layer labeling means 15 performs the maximum flow minimum cut algorithm for each layer to label each vertex on each layer with the virtual label 0 or the virtual label 1, and the label determining means 16 determines the label of each site based on the virtual labels assigned to the vertices $w^1_v$ on the first layer and the vertices $w^2_v$ on the second layer, in the same manner as in the previously described embodiment. Thus, the region segmentation is finished.

While the fourth-order energy has been described above, an Nth-order energy that is the fourth- or a higher order energy can be used when classification is performed such that N pixels that are four or more pixels are classified into the same class. Similarly to the energy shown in FIG. 20, the Nth-order energy can be expressed in the form of a graph including edges that connect vertices $w^i_v$ corresponding to the N pixels to the virtual vertices $v^i_1$ and $v^i_2$, and edges that connects the virtual vertices $v^i_1$ and $v^i_2$ to the vertex t and the vertex s.

Further, when classification into multiple classes of the second- or a higher order is performed using a high order energy, such as the fourth- or a higher order energy, the classification into multiple classes can be achieved using a binary graph set for each layer i with respect to the Nth-order energy correspondingly to edges that connect N vertices $w^i_v$ to the vertex s and the vertex t via the virtual vertex $v^i_1$ and $v^i_2$, respectively, as shown in FIG. 21.

While the case where four pixels are located along a straight line has been described above, N pixels that are four or more pixels may be selected such that the pixels represent a specific shape to allow classifying structures having the specific shape into the same class. For example, selecting pixels to represent various shapes, such as a curved line, a plane, a curved surface, a circle, a sphere, etc., allows separating structures having the shape from the image.

While the cases where classification is performed depending on the pixel value (or luminance value) of each pixel forming an image have been described above, an energy that depends on the pixel values of surrounding pixels, or depends on information other than the pixel values may be determined. For example, an energy that depends on whether selected three (or more) pixels are located along a straight line may be set. Still alternatively, an energy that depends on a distance from a separately set reference point may be set. In a case where a blood vessel region is segmented, for example, the reference point may be the center coordinates of the blood vessel.

While the cases where the second-order energy is determined correspondingly to the relationship between adjacent two pixels have been described, the second-order energy may be determined correspondingly to the relationship between arbitrary two pixels which may not be adjacent pixels. For example, another pixel may be present between the two pixels, or the two pixels corresponding to specific positions on two images may be selected.

While the cases where the third-order energy is determined correspondingly to the relationship among adjacent three pixels have been described, the third-order energy may be determined correspondingly to the relationship among arbitrary three pixels which may not be adjacent pixels. For example, the three pixels may be located at every other position, or the three pixels may represent a specific shape, such as a triangle.

What is claimed is:

1. A classifying device for classifying each pixel forming image data into one of N labels, where N>2, which are ordered from 0 to N−1, the classifying device comprising:
    a processor configured to assign each pixel with one of the N labels (i) by using a graph that includes k layers, where k=N−1, which are set between a vertex s and a vertex t and each of which layers is a boundary between the labels, vertices $w^\alpha_v$, where α=1, . . . , k, which are set on each layer α, where α=1, . . . , k, and which vertices correspond to locations v of individual pixels of the image, and edges each connecting two of the vertices $w^\alpha_v$, the vertex t, and the vertex s, and (ii) by determining edges to be cut among the edges by a graph cut operation,
    wherein the processor is configured to execute the following instructions, which comprise:

setting, for each i-th layer i that is the boundary between a label i−1 and a label i of the N labels, a binary graph including edges each connecting two of the vertices $w^i_v$, the vertex s corresponding to a virtual label 0, and the vertex t corresponding to a virtual label 1, wherein the virtual label 1 indicates that a label that is equal to or higher than i is assigned to the location v corresponding to the vertex $w^i_v$ on the layer i, and the virtual label 0 indicates that a label that is equal to or lower than i−1 is assigned to the location v corresponding to the vertex $w^i_v$ on the layer i;

setting an energy for each edge of the binary graph for each layer depending on which of the virtual label 0 and the virtual label 1 each vertex belongs to;

assigning one of the virtual label 0 and the virtual label 1 to each vertex $w^i_v$ on each layer by determining edges to be cut among the edges of the binary graph of the layer by performing a graph cut operation on the entire graph including the binary graphs for the individual layers with the energies set therefor, and determining which of the N labels the pixel at each location v belongs to depending on which of the virtual label 0 and the virtual label 1 is assigned to each vertex $w^i_v$, where i=1, . . . , k, on the first to the k-th layers, which corresponds to the same location v, wherein the binary graph includes an edge that connects two vertices $w^i_v$ on the same layer i to each other, an edge $(s, w^i_v)$ that connects the vertex s to each vertex $w^i_v$, and an edge $(w^i_v, t)$ that connects each vertex $w^i_v$ to the vertex t, wherein the processor determines, for each vertex $w^i_v$, that the label 0 is assigned to the pixel corresponding to the vertex $w^i_v$ if all the vertices $w^i_v$ corresponding to the same location v on all the layers belong to the virtual label 0, that the label N−1 is assigned to the pixel corresponding to the vertex $w^i_v$ if all the vertices $w^i_v$ corresponding to the same location v on all the layers i belong to the virtual label 1, and that the pixel corresponding to the vertex $w^i_v$ belongs to a class p if the vertices $w^i_v$ corresponding to the same location v on the first to the p-th layers belong to the virtual label 0 and the vertices $w^i_v$ corresponding to the same location v on the p+1-th to the N−1-th layers belong to the virtual label 1, and wherein the processor sets a fourth- or higher order energy, which is determined depending on whether or not all of arbitrary four or more vertices on the same layer belong to the virtual label 0 or the virtual label 1, for each of edges that connect the four vertices $w^i_v$ to the vertex s or the vertex t via a virtual vertex $v^i$ for each layer.

2. The classifying device as claimed in claim 1, wherein the processor sets a first-order energy for each of the edge $(s, w^i_v)$ that connects the vertex s to the vertex $w^i_v$ and the edge $(w^i_v, t)$ that connects the vertex $w^i_v$ to the vertex t, and sets a second-order energy for the edge that connects two vertices $w^i_v$ and $w^i_u$ on the same layer to each other.

3. The classifying device as claimed in claim 2, wherein the first-order energy is determined such that the first-order energy set for the edge $(s, w^i_v)$ is larger than the first-order energy set for the edge $(w^i_v, t)$ if there is a high likelihood that the pixel corresponding to the vertex $w^i_v$ has a pixel value that belongs to the virtual label 0, and the first-order energy set for the edge $(s, w^i_v)$ is smaller than the first-order energy set for the edge $(w^i_v, t)$ if there is a high likelihood that the pixel corresponding to the vertex $w^i_v$ has a pixel value that belongs to the virtual label 1, and the second-order energy is determined such that a smaller second-order energy is set for the edge $(w^i_v, w^i_u)$ if it is more likely that the pixel corresponding to the vertex $w^i_v$ and the pixel corresponding to the adjacent vertex $w^i_u$ belong to the different virtual labels.

4. The classifying device as claimed in claim 1, wherein the processor is further configured to select four or more of the pixels such that the pixels represent a specific shape.

5. The classifying device as claimed in claim 1, where the image data includes image data of a blood vessel, and the pixels are classified into three labels corresponding to a background other than the blood vessel, an inner diameter of the blood vessel, and an outer diameter of the blood vessel.

6. A non-transitory storing medium containing a classifying program for causing a computer to function as a classifying device for classifying each pixel forming image data into one of N labels, where N>2, which are ordered from 0 to N−1, wherein the computer functions as a labeling unit for assigning each pixel with one of the N labels by using a graph that includes k layers, where k=N−1, which are set between a vertex s and a vertex t and each of which layers is a boundary between the labels, vertices $w^\alpha_v$, where $\alpha=1, \ldots, k$, which are set on each layer $\alpha$, where $\alpha=1, \ldots, k$, and which vertices correspond to locations v of individual pixels of the image, and edges each connecting two of the vertices $w^\alpha_v$, the vertex t, and the vertex s, and by determining edges to be cut among the edges by a graph cut operation, wherein the labeling unit comprises:

a binary graph setting unit for setting, for each i-th layer i that is the boundary between a label i−1 and a label i of the N labels, a binary graph including edges each connecting two of the vertices $w^i_v$, the vertex s corresponding to a virtual label 0, and the vertex t corresponding to a virtual label 1, wherein the virtual label 1 indicates that a label that is equal to or higher than i is assigned to the location v corresponding to the vertex $w^i_v$ on the layer i, and the virtual label 0 indicates that a label that is equal to or lower than i−1 is assigned to the location v corresponding to the vertex $w^i_v$ on the layer i;

an energy setting unit for setting an energy for each edge of the binary graph for each layer depending on which of the virtual label 0 and the virtual label 1 each vertex belongs to;

a layer-by-layer labeling unit for assigning one of the virtual label 0 and the virtual label 1 to each vertex $w^i_v$ on each layer by determining edges to be cut among the edges of the binary graph of the layer by performing a graph cut operation on the entire graph including the binary graphs for the individual layers with the energies set therefor; and a label determining unit for determining which of the N labels the pixel at each location v belongs to depending on which of the virtual label 0 and the virtual label 1 is assigned to each vertex $w^i_v$, where i=1, . . . , k, on the first to the k-th layers, which corresponds to the same location v, the binary graph includes an edge that connects two vertices $w^i_v$ on the same layer i to each other, an edge $(s, w^i_v)$ that connects the vertex s to each vertex $w^i_v$, and an edge $(w^i_v, t)$ that connects each vertex $w^i_v$ to the vertex t, the label determining unit determines, for each vertex $w^i_v$, that the label 0 is assigned to the pixel corresponding to the vertex $w^i_v$ if all the vertices $w^i_v$ corresponding to the same location v on all the layers belong to the virtual label 0, that the label N−1 is assigned to the pixel corresponding to the vertex $w^i_v$ if all the vertices $w^i_v$ corresponding to the same location v on all the layers i belong to the virtual label 1, and that the pixel corresponding to the vertex $w^i_v$ belongs to a class p if the vertices $w^i_v$ corresponding to the same location v on the first to the p-th layers belong to the virtual label 0 and the vertices $w^i_v$ corresponding to the same location v on the p+1-th to the N−1-th layers belong to the virtual label 1, and the energy setting unit sets a fourth- or higher order energy, which is determined depending on whether or not all of arbitrary four or more vertices on the same layer belong to the virtual label 0 or the virtual label 1, for each of edges that connect the four vertices $w^i_v$ to the vertex s or the vertex t via a virtual vertex $v^i$ for each layer.

7. A method of operating a classifying device including a labeling unit for classifying each pixel forming image data into one of N labels, where N>2, which are ordered from 0 to N−1, the method comprising a labeling step wherein the labeling unit assigns each pixel with one of the N labels by using a graph that includes k layers, where k=N−1, which are set between a vertex s and a vertex t and each of which layers is a boundary between the labels, vertices $w^\alpha_v$, where α=1, ..., k, which are set on each layer α, where α=1, ..., k, and which vertices correspond to locations v of individual pixels of the image, and edges each connecting two of the vertices $w^\alpha_v$, the vertex t, and the vertex s, and by determining edges to be cut among the edges by a graph cut operation, wherein the labeling step comprises:

a binary graph setting step of setting, for each i-th layer i that is the boundary between a label i−1 and a label i of the N labels, a binary graph including edges each connecting two of the vertices $w^i_v$, the vertex s corresponding to a virtual label 0, and the vertex t corresponding to a virtual label 1, wherein the virtual label 1 indicates that a label that is equal to or higher than i is assigned to the location v corresponding to the vertex $w^i_v$ on the layer i, and the virtual label 0 indicates that a label that is equal to or lower than i−1 is assigned to the location v corresponding to the vertex $w^i_v$ on the layer i;

an energy setting step of setting an energy for each edge of the binary graph for each layer depending on which of the virtual label 0 and the virtual label 1 each vertex belongs to;

a layer-by-layer labeling step of assigning one of the virtual label 0 and the virtual label 1 to each vertex $w^i_v$ on each layer by determining edges to be cut among the edges of the binary graph of the layer by performing a graph cut operation on the entire graph including the binary graphs for the individual layers with the energies set therefor; and a label determining step of determining which of the N labels the pixel at each location v belongs to depending on which of the virtual label 0 and the virtual label 1 is assigned to each vertex $w^i_v$, where i=1, ..., k, on the first to the k-th layers, which corresponds to the same location v, the binary graph includes an edge that connects two vertices $w^i_v$ on the same layer i to each other, an edge $(s, w^i_v)$ that connects the vertex s to each vertex $w^i_v$, and an edge $(w^i_v, t)$ that connects each vertex $w^i_v$ to the vertex t, the label determining step comprises determining, for each vertex $w^i_v$, that the label 0 is assigned to the pixel corresponding to the vertex $w^i_v$ if all the vertices $w^i_v$ corresponding to the same location v on all the layers belong to the virtual label 0, that the label N−1 is assigned to the pixel corresponding to the vertex $w^i_v$ if all the vertices $w^i_v$ corresponding to the same location v on all the layers i belong to the virtual label 1, and that the pixel corresponding to the vertex $w^i_v$ belongs to a class p if the vertices $w^i_v$ corresponding to the same location v on the first to the p-th layers belong to the virtual label 0 and the vertices $w^i_v$ corresponding to the same location v on the p+1-th to the N−1-th layers belong to the virtual label 1, and the energy setting step comprises setting a fourth- or higher order energy, which is determined depending on whether or not all of arbitrary four or more vertices on the same layer belong to the virtual label 0 or the virtual label 1, for each of edges that connect the four vertices $w^i_v$ to the vertex s or the vertex t via a virtual vertex $v^i$ for each layer.

8. A classifying device for classifying each pixel forming image data into one of N labels, where N>2, which are ordered from 0 to N−1, the classifying device comprising:

a processor configured to determine the label of each pixel by minimizing a third-order energy $E_l^{ijk}$:

$$E_l^{ijk} = \sum_{\alpha=1\ldots N-1} E_l^{vi,vj,vk}(F(w_{vi}, \alpha), F(w_{vj}, \alpha), F(w_{vk}, \alpha))$$

where $F(w_{vi}, \alpha), F(w_{vj}, \alpha),$ $$F(w_{vk}, \alpha) = \begin{cases} 0 & \text{if } w_{vi}, w_{vj}, \text{ and } w_{vk} \text{ belong to a class lower than } \alpha \\ 1 & \text{else} \end{cases}$$

which depends on labels of locations vi, vj, and vk of three pixels of the image using a graph-cut technique.

9. A non-transitory storing medium containing a classifying program for causing a computer to function as a classifying device for classifying each pixel forming image data into one of N labels, where N>2, which are ordered from 0 to N−1, wherein the computer functions as a labeling unit for determining the label of each pixel by minimizing a third-order energy $E_l^{ijk}$:

$$E_l^{ijk} = \sum_{\alpha=1\ldots N-1} E_l^{vi,vj,vk}(F(w_{vi}, \alpha), F(w_{vj}, \alpha), F(w_{vk}, \alpha))$$

where $F(w_{vi}, \alpha), F(w_{vj}, \alpha),$ $$F(w_{vk}, \alpha) = \begin{cases} 0 & \text{if } w_{vi}, w_{vj}, \text{ and } w_{vk} \text{ belong to a class lower than } \alpha \\ 1 & \text{else} \end{cases}$$

which depends on labels of locations vi, vj, and vk of three pixels of the image using a graph-cut technique.

10. A method of operating a classifying device including a processor configured to classify each pixel forming image data into one of N labels, where N>2, which are ordered from 0 to N−1, the method comprising:

determining, by the processor, the label of each pixel by minimizing a third-order energy $E_l^{ijk}$:

$$E_l^{ijk} = \sum_{\alpha=1...N-1} E_l^{vi,vj,vk}(F(w_{vi}, \alpha), F(w_{vj}, \alpha), F(w_{vk}, \alpha))$$

where $F(w_{vi}, \alpha), F(w_{vj}, \alpha),$ $$F(w_{vk}, \alpha) = \begin{cases} 0 & \text{if } w_{vi}, w_{vj}, \text{ and } w_{vk} \text{ belong to a class lower than } \alpha \\ 1 & \text{else} \end{cases}$$

which depends on labels of locations vi, vj, and vk of three pixels of the image using a graph-cut technique.

11. The method of operating the classifying device according to claim 10, further comprising outputting the image based on the label of each pixel in the image.

* * * * *